US010593174B1

(12) United States Patent
Yoon

(10) Patent No.: US 10,593,174 B1
(45) Date of Patent: Mar. 17, 2020

(54) AUTOMATIC SETUP MODE AFTER DISCONNECT FROM A NETWORK

(71) Applicant: Amazon Technologies, Inc., Seattle, WA (US)

(72) Inventor: Joshua Hongpyo Yoon, Los Angeles, CA (US)

(73) Assignee: Amazon Technologies, Seattle, WA (US)

( * ) Notice: Subject to any disclaimer, the term of this patent is extended or adjusted under 35 U.S.C. 154(b) by 0 days.

(21) Appl. No.: 16/219,743

(22) Filed: Dec. 13, 2018

(51) Int. Cl.
*G08B 13/196* (2006.01)
*G08B 25/00* (2006.01)
*H04L 12/28* (2006.01)
*H04W 76/15* (2018.01)

(52) U.S. Cl.
CPC ..... *G08B 13/19669* (2013.01); *G08B 25/008* (2013.01); *H04L 12/2805* (2013.01); *H04L 12/2816* (2013.01); *H04W 76/15* (2018.02); *H04L 2012/2841* (2013.01); *H04L 2012/2849* (2013.01)

(58) Field of Classification Search
CPC .............................. H04W 24/02; G06F 3/165
See application file for complete search history.

(56) References Cited

U.S. PATENT DOCUMENTS

| | | | | |
|---|---|---|---|---|
| 2011/0034199 | A1* | 2/2011 | Zhao | H04L 69/28 455/510 |
| 2015/0026317 | A1* | 1/2015 | Ilsar | H04L 41/0816 709/221 |
| 2015/0026779 | A1* | 1/2015 | Ilsar | H04W 12/06 726/5 |
| 2017/0250835 | A1* | 8/2017 | Kim | H04L 12/2838 |
| 2019/0090176 | A1* | 3/2019 | Peters | H04W 76/40 |
| 2019/0116087 | A1* | 4/2019 | Hiller | H04W 76/11 |

\* cited by examiner

*Primary Examiner* — Fabricio R Murillo Garcia
(74) *Attorney, Agent, or Firm* — Lee & Hayes, P.C.

(57) ABSTRACT

A device in a home security system may detect a disconnect from a network and enter automatic setup mode based on trigger conditions. The trigger conditions are used to determine that the disconnect is based on changes to network configuration settings. The trigger conditions may include failing multiple attempts to access the network using a saved network password, or determining that an access point signal with a saved service set identifier has not been detected for at least a threshold time. Based on one or more trigger conditions being met, the device may enter automatic setup mode to receive updated configuration settings from a client device.

17 Claims, 14 Drawing Sheets

AUTOMATIC SETUP MODE AFTER DISCONNECT FROM A NETWORK

TECHNICAL FIELD

The present embodiments relate to audio/video (A/V) recording and communication devices (A/V devices), including A/V doorbells, security cameras, and floodlight controllers. In particular, the present embodiments relate to improvements in the functionality of A/V devices that strengthen the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. A/V devices, such as doorbells, provide this functionality, and can also aid in crime detection and prevention. For example, audio and/or video captured by an A/V device can be uploaded to the cloud and recorded on a remote server. Subsequent review of the A/V footage can aid law enforcement in capturing perpetrators of home burglaries and other crimes. Further, the presence of one or more A/V devices on the exterior of a home, such as a doorbell unit at the entrance to the home, acts as a powerful deterrent against would-be burglars.

BRIEF DESCRIPTION OF THE DRAWINGS

The various embodiments of the present automatic setup mode after disconnect from a network now will be discussed in detail with an emphasis on highlighting the advantageous features. These embodiments depict the novel and non-obvious features of automatic setup mode after disconnect from a network shown in the accompanying drawings, which are for illustrative purposes only. These drawings include the following figures, in which like numerals indicate like parts.

DETAILED DESCRIPTION

Figure 1:
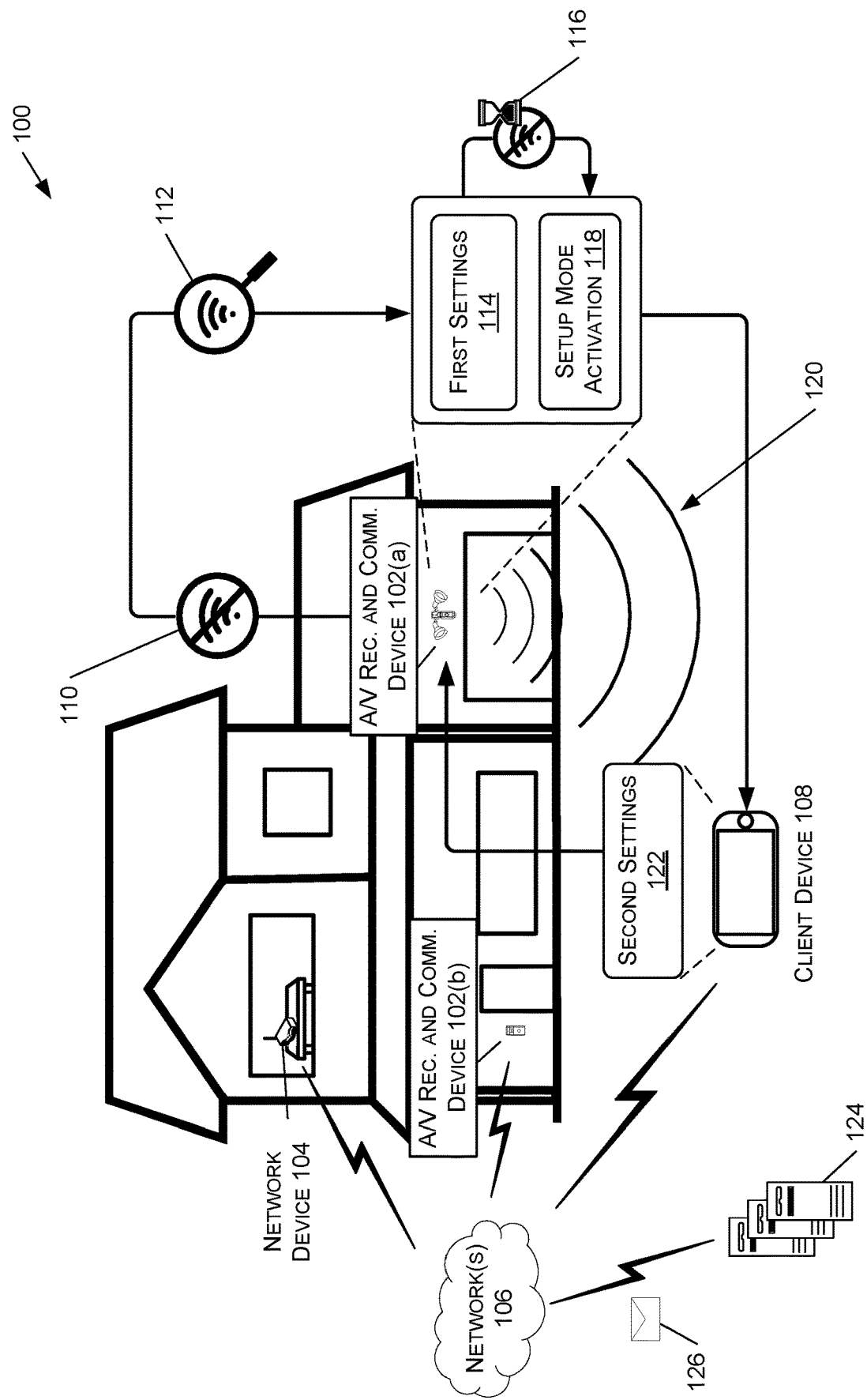
FIG. 1 is a schematic diagram of an example system for an A/V device automatically entering setup mode after extended disconnect time from a network, according to various aspects of the present disclosure.

The various embodiments of the present automatic setup mode after disconnect from a network have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

A/V recording and communication devices (e.g., referred to as "A/V devices"), such as video doorbells and floodlight cams, may establish a connection with a network (e.g., a Wi-Fi network) in order to communicate with other A/V devices, a client device (e.g., a smartphone), network device(s), and/or the like. The A/V devices may store configuration settings for the network, and the A/V devices may use the stored configuration settings to automatically attempt to reconnect to the network in the event of a disconnect. In some situations, the stored configuration settings may no longer be valid due to a change in the configuration settings or a change of an electronic device (e.g., a router) that allows the A/V devices to connect to the network. For example, in the case of a changed router, when the user swaps out the old router for a new router, the user may use the default configuration settings assigned to the new router. In this situation, the A/V devices would not be able to establish a connection with the new electronic device, because the stored configuration settings on the A/V devices would not match the default configuration settings assigned to the new router. In another example, a user may change the password for an existing router, but may neglect to update the stored configuration settings on the A/V devices to include the new password. In this situation, again, the A/V devices would not be able to establish a connection with the router.

One aspect of the present embodiments includes the realization that A/V devices may require updates to the configuration settings (e.g., network connectivity settings) from time to time. In order to update the configuration settings, the A/V device may require that the user of the device manually put the A/V device into a device setup mode (e.g., by pressing a setup button on the device). However, A/V devices may be mounted out of reach of the user (e.g., above a garage door, along the roof line of the property, etc.) and/or may be difficult to detach from their installation point (e.g., require removing multiple screws, detaching wires, etc.).

The present embodiments solve these problems by leveraging the functionality of A/V devices to activate a device setup mode in response to an extended disconnect time from a network. For example, after initial detection of a loss of a network connection, the A/V device may attempt to reconnect to the network and may also activate a timer to measure time lapse since disconnect. In response to the number of reconnect attempts exceeding a threshold value, and/or the timer exceeding a threshold time, the A/V device may activate the device setup mode. Additionally, a network device that may have been connected to and communicating with the A/V device may detect the connection loss and similarly activate a timer to determine when the A/V device may be activating the device setup mode. After a threshold time, the network device may generate and transmit a message to a client device associated with the A/V device, where the message includes instructions to perform device configuration for the A/V device. As a result, the A/V device may be reconfigured (e.g., receiving updated configuration settings) without the user having to manually put the A/V device into setup mode. Ultimately, the user may be more likely to promptly reconfigure the A/V device when the A/V device needs to be reconfigured (e.g., when the communication settings for the network that the A/V device is connected to have changed). By reconfiguring the A/V device sooner, the A/V device is able to provide the intended safety and security to the property at an earlier time, thereby contributing to the safety of the property, the neighborhood, and the public as a whole.

For example, an A/V device may enter automatic setup mode based on one or more trigger conditions being met. The trigger conditions indicate that a network connectivity loss is likely due to the A/V device needing updates to its configuration settings, and not that the connected networking device (e.g., a wireless router) is experiencing general Internet access issues. One example trigger condition is repeated attempts, for a threshold number of attempts or a threshold length of time, by the A/V device to connect to the same networking device with stored credentials (e.g., a WiFi protected access (WPA) password). Another example trigger condition is the A/V device cannot detect an access point (AP) signal with a known service set identifier (SSID) for a threshold time. Non-trigger conditions may indicate general Internet access issues, such as being connected to the WiFi network but unable to reach the Internet, or the AP signal is detected but the A/V device cannot establish a successful WiFi connection. These non-trigger conditions indicate issues that are likely caused by the Internet service provider (ISP) rather than by updates to a network device or network device settings. By determining whether trigger conditions have been met before entering automatic setup mode, the present embodiments advantageously overcome network connectivity issues related to configuration settings by prompting a user to reconfigure the settings without requiring the user to physically press a setup button on the device, while refraining from broadcasting an AP signal when the connectivity issues may not be related to the configuration settings. The present embodiments thus prevent the A/V device from broadcasting signals for setup mode when unnecessary, while still allowing the user to update the configuration settings without physically triggering setup mode when necessary.

The remaining detailed description describes the present embodiments with reference to the drawings. In the drawings, reference numbers label elements of the present embodiments. These reference numbers are reproduced below in connection with the discussion of the corresponding drawing features.

FIG. 1 is a schematic diagram of an example system 100 for an A/V device 102(*a*) automatically entering setup mode after extended disconnect time from a network 106, according to various aspects of the present disclosure. More particularly, the example system 100 may include one or more A/V devices 102(*a*)-(*b*) (which may also be referred to as "A/V devices 102"), a network device 104, the network(s) 106, and a client device 108.

The A/V devices 102 may include light cameras 102(*a*) (e.g., floodlight cameras, spotlight cameras, etc.), video doorbells 102(*b*) (e.g., wall powered and/or battery powered video doorbells), and/or other devices capable of recording audio data and/or image data. The A/V devices 102 may be configured to access the network(s) 106 to connect to another network (e.g., Internet/PSTN), and/or may be configured to access a cellular network (not shown) to connect to the network (e.g., Internet/PSTN). In various examples, the A/V devices 102 may store configuration settings (e.g., first configuration settings 114) that are used to access the network(s) 106.

The network device 104 may comprise any device that facilitates communication with and control of the one or more A/V devices 102 and/or the client device 108. For example, the network device 104 may be a wireless router (e.g., a Wi-Fi router) and/or a component (e.g., a hub) of a security system and/or a home automation system installed at a location (e.g., a property, a premises, a home, a business, etc.). In some embodiments, the A/V devices 102 and/or the client device 108 communicate with the network device 104 directly and/or indirectly using the network(s) 106 (e.g., Wi-Fi, Ethernet, etc.).

The network(s) 106 may be, for example, a wired and/or wireless network. If the network(s) 106 is wireless (e.g., a wireless local area network (WLAN)), or includes a wireless component, the network(s) 106 may be a Wi-Fi network compatible with the IEEE 802.11 standard and/or any other wireless communication standard(s).

The system 100 may further include a client device 108. The client device 108 may communicate with and/or be associated with (e.g., capable of accessing and/or controlling) the A/V devices 102 and the network device 104. In various embodiments, the client device 108 communicates with other devices using one or more wireless and/or wired communication protocols using the network(s) 106 and/or the another network (e.g., Internet/PSTN), as described herein. The client device 108 may comprise, for example, a mobile device such as a smartphone or a personal digital assistant (PDA), or a computing device such as a tablet computer, a laptop computer, a desktop computer, etc.

In some examples, the system 100 may include a newly installed network device 104 having different network settings than its predecessor and thus, the A/V devices 102 may experience network connection loss until the A/V devices 102 are reconfigured with correct configuration settings (e.g., second configuration settings 122) that are associated with the network device 104 and/or the network(s) 106. In the present example, after the newly installed network device 104 has been set up, the user/owner of the A/V devices 102(*a*)-102(*b*) may update the configuration settings for the A/V device 102(*b*) (may be referred to as "second A/V device 102(*b*)") by manually pressing the setup button on the second A/V device 102(*b*), because the setup button on the second A/V device 102(*b*) is easily accessible. Thus, the second A/V device 102(*b*) is currently connected to the network(s) 106 via the newly installed network device 104.

The configuration settings for the A/V device 102(*a*) (may be referred to as "first A/V device 102(*a*)"), however, may not have been updated yet because the setup button on the first A/V device 102(*a*) is harder to access (e.g., because the first A/V device 102(*a*) is mounted high up). The first A/V device 102(*a*) may thus determine that it is experiencing a network connection loss 110 (e.g., an inability to communicate with the network(s) 106). In some examples, the first A/V device 102(*a*) may then initiate a disconnect timer and/or save the time of disconnect as a point of reference, and may attempt to reestablish the connection to the network(s) 106. For example, the first A/V device 102(a) may perform a network search 112 using the first configuration settings 114. The first A/V device 102(a) may continue attempting to reestablish the connection to the network(s) 106 until either a threshold time 116 has elapsed since the network connection loss 110 occurred, or a threshold number reconnect attempts have been made. When either threshold has been reached, the A/V device 102(a) may perform setup mode activation 118, during which the A/V device 102(a) broadcasts as an access point (AP) 120 (e.g., Bluetooth, Wi-Fi Direct, etc.). In an additional and/or alternate example, the A/V device 102(a) may initiate searching for an AP broadcast by the client device 108 (e.g., based on previously stored settings of the A/V device 102(a) for connecting to the client device AP). In the present example, the client device 108 may connect to the A/V device 102(a) using the example AP 120, and may then transmit the second configurations settings 122 to the A/V device 102(a). In response to receiving the second configuration settings 122, the A/V device 102(a) may establish a connection with the network(s) 106, via the network device 104, using the second configuration settings 122. The A/V device 102(a) may then deactivate the setup mode.

In some examples, and before the A/V device 102(a) receives the second configuration settings 122, the network device(s) 124 may determine that the A/V device 102(a) has lost the connection to the network(s) 106. The network device(s) 124 may then start a timer and use the timer to determine that the A/V device 102(a) has not reconnected with the network(s) 106 within the threshold time 116. In response, the network device(s) 124 may generate, and transmit to the client device 108, a message 126 that includes an indication that the A/V device 102(a) has been disconnected from the network(s) 106 for the threshold time 116, and/or includes instructions for configuring the A/V device 102(a). In some examples, the instructions may indicate that the A/V device 102(a) is operating in the setup mode and/or indicate a time(s) at which the A/V device 102(a) will be operating in the setup mode.

The client device 108 may receive the message 126 from the network device(s) 124 and, in response, display, on a display screen of the client device 108, the indication that the A/V device 102(a) has been disconnected from the network(s) 106 for the threshold time 116, and/or display the instruction for configurating the A/V device 102(a). A user of the client device 108 may then determine, based on the indication and/or the instruction, that the A/V device 102(a) is operating in the setup mode. The user may then move the client device 108 to be in proximity of the A/V device 102(a) such that the client device 108 is able to transmit the second configuration settings 122 to the A/V device 102(a) using the AP 120 while the A/V device 102(a) is operating in the setup mode.

Figure 2:
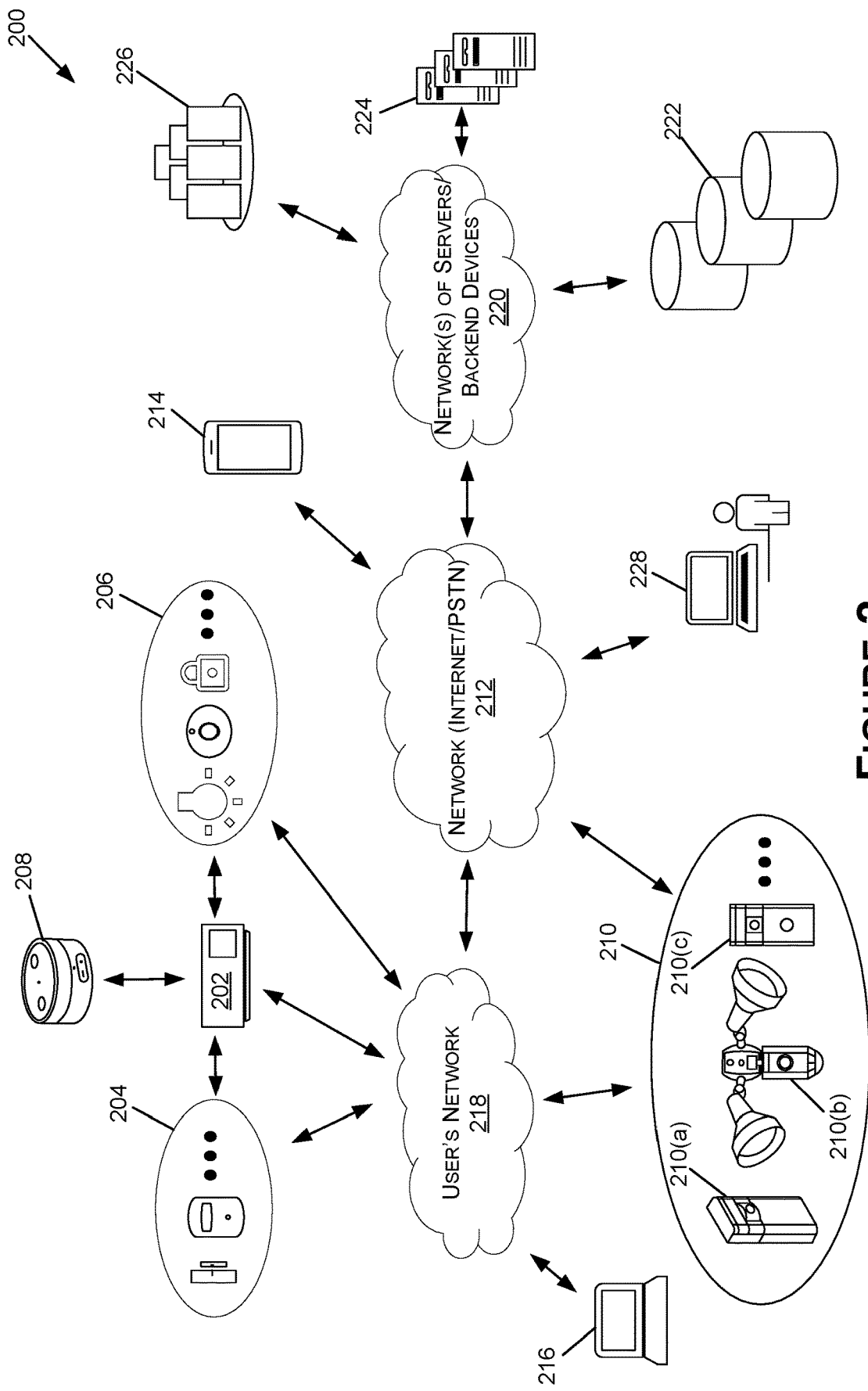
FIG. 2 is a functional block diagram illustrating a system for communicating in a network according to various aspects of the present disclosure.

FIG. 2 is a functional block diagram illustrating a system 200 for communicating in a network according to various aspects of the present disclosure. Home automation, or smart home, is building automation for the home. Home automation enable users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, audio/video (A/V) recording and communication devices 210, etc.), when remotely monitored and controlled via a network (Internet/a public switched telephone network (PSTN)) 212 (which may be similar to, and represent the network(s) 106), may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, an intelligent personal assistance device, or simply a network device) from which the system may be controlled through various user interfaces, such as voice commands and/or a touchscreen. Various examples, of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V devices 210, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 (which may represent, and/or be similar to, the network(s) 106 of FIG. 1) may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V devices 210 (alternatively be referred to herein as "A/V devices 210" or "A/V device 210") (which may represent, and/or be similar to, the A/V devices 102 of FIG. 1). The A/V devices 210 may include security cameras 210(a), light cameras 210(b) (e.g., floodlight cameras, spotlight cameras, etc.), video doorbells 210(c) (e.g., wall powered and/or battery powered video doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 3.

The system 200 may further include a smart-home hub device 202 (which may alternatively be referred to herein as the "hub device 202") connected to the user's network 218 and/or the network (Internet/PSTN) 212. The smart-home hub device 202 (also known as a home automation hub, gateway device, or network device), may comprise any device that facilitates communication with and control of the sensors 204, automation devices 206, the VA device 208, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, or A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various embodiments, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 202). A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices.

As described herein, in some of the present embodiments, some or all of the client devices 214, 216, the A/V device(s) 210, the smart-home hub device 202, the VA device 208, the sensors 204, and the automation devices 206 may be referred to as a security system and/or a home-automation system. The security system and/or home-automation system may be installed at location, such as a property, home, business, or premises for the purpose of securing and/or automating all or a portion of the location.

The system 200 may further include one or more client devices 214, 216 (which may represent, and/or be similar to, the client device 108 of FIG. 1). The client devices 214, 216 may communicate with and/or be associated with (e.g., capable of access to and control of) the A/V devices 210, a smart-home hub device 202, the VA device 208, sensors 204, and/or automation devices 206. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, and/or the client devices 214, 216 may also communicate, via the user's network 218 and/or the network (Internet/PSTN) 212, with network(s) of servers and/or backend devices 220, such as (but not limited to) one or more remote storage devices 222 (may be referred to interchangeably as "cloud storage device(s)"), one or more servers 224, and one or more application programming interfaces (APIs) 226. While FIG. 2 illustrates the storage device 222, the server(s) 224, and the API 226 as components separate from the network 220, the storage device 222, the server(s) 224, and/or the API 226 may be considered to be components of the network 220. For example, the network 220 may include a data center with a plurality of computing resources used to implement the storage device 222, the server(s) 224, and the API 226.

The server(s) 224 may comprise a computer program or other computer executable code that, when executed by processor(s) of the server(s) 224, causes the server(s) 224 to wait for requests from other computer systems or software (clients) and provide responses. In an embodiment, the server(s) 224 shares data and/or hardware and/or software resources among the client devices 214, 216. This architecture is called the client-server model. The client devices 214, 216 may run on the same computer or may connect to the server(s) 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes. Further, the server(s) 224 may be referred to in some embodiments as network devices.

The API 226 may comprise, for example, a server (e.g. a real server, or a virtual machine, or a machine running in a cloud infrastructure as a service), or multiple servers networked together, exposing at least one API to clients. In various embodiments, the API 226 is provided by servers including various components such as an application server (e.g. software servers), a caching layer, a database layer, or other components suitable for implementing one or more APIs. The API 226 may, for example, comprise a plurality of applications, each of which communicate with one another using one or more public APIs. In some embodiments, the API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the server(s) 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The hub device 202, the VA device 208, and/or any of the components of the network(s) of servers/backend devices 220 (e.g., the server(s) 224, the API 226, the storage devices 222, etc.) may be referred to herein as a "network device" or "network devices." The network device 104 of FIG. 1 may include one or more of the network devices described herein.

With further reference to FIG. 2, the system 200 may also include a security monitoring service 228. The security monitoring service 228 may be operated by the same company that manufactures, sells, and/or distributes the A/V devices 210, the hub device 202, the VA device 208, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.). For example, the security monitoring service 228 may operate and control their own client devices and/or network of servers/backend devices for monitoring and/or controlling security systems. In such an example, the A/V devices 210, the hub device 202, the VA device 208, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of backend servers/backend devices 220).

Figure 3:
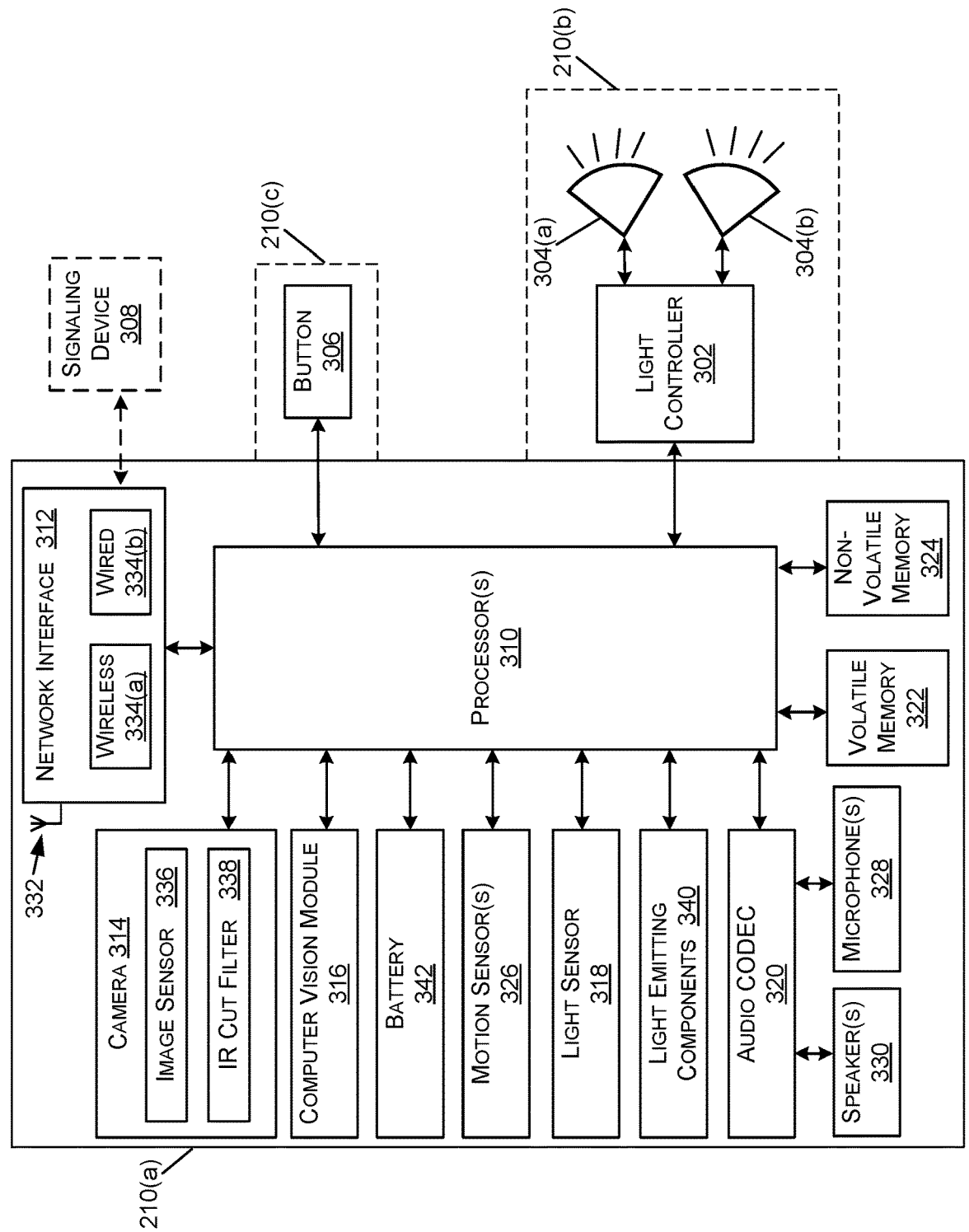
FIGS. 3 and 4 are functional block diagrams illustrating example A/V devices according to various aspects of the present disclosure.

FIG. 3 is a functional block diagram for an audio/video (A/V) device according to various aspects of the present disclosure. In some embodiments, the one or more A/V devices 210 may include the security camera 210(*a*). In other embodiments, the one or more A/V devices 210 may include the light camera 210(*b*), which may include some or all of the components of the security camera 210(*a*) in addition to a light controller 302 and one or more lights 304(*a*), 304(*b*). In some embodiments, the one or more A/V devices 210 may include the video doorbell 210(*c*), which may include some or all of the components of the security camera 210(*a*) in addition to a button 306, and in some embodiments, a connection to a signaling device 308 (e.g., a pre-installed signaling device, such as a wired signaling device, and/or a wireless signaling device, connected over Wi-Fi, BLE, or the another wireless communication protocol).

With further reference to FIG. 3, the A/V device 210 may include a processor(s) 310, a network interface 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller) may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the network interface 312, and may perform various functions as described in the present disclosure. In various embodiments, when the processor(s) 310 is triggered by the motion sensor(s) 326, the camera 314, the speaker(s) 330, the microphone(s) 328, the network interface 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the network interface 312 and the camera 314.

With further reference to FIG. 3, the network interface 312 may comprise an integrated circuit including a processor core, memory, and programmable input/output peripherals. The network interface 312 may be operatively connected to the processor(s) 310. In some embodiments, the network interface 312 is configured to handle communication links between the A/V device 210 and other, external devices, external receivers, external transmitters, and/or external transceivers, and to route incoming/outgoing data appropriately. For example, inbound data from an antenna 332 of the network interface 312 may be routed through the network interface 312 before being directed to the processor(s) 310, and outbound data from the processor(s) 310 may be routed through the network interface 312 before being directed to the antenna 332 of the network interface 312. As another example, the network interface 312 may be configured to transmit data to and/or receive data from a remote network device (e.g., one or more components of the network(s) of servers/backend devices 220 described in FIG. 2). The network interface 312 may include wireless 334(*a*) and wired 334(*b*) adapters. For example, the network interface 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The network interface 312 may receive inputs, such as power and/or data, from the camera 314, the processor(s) 310, the button 306 (in embodiments where the A/V device 210 is the video doorbell 210(*c*)), the motion sensors 326, a reset button (not shown in FIG. 3 for simplicity), and/or the non-volatile memory 324. The network interface 312 may also include the capability of communicating over wired connections, such as with a signaling device 308. For example, when the button 306 of the video doorbell 210(*c*) is pressed, the network interface 312 may be triggered to perform one or more functions, such as to transmit a signal over the wired 334(*b*) connection to the signaling device 308 (although, in some embodiments, the signal be transmitted over a wireless 334(*a*) connection to the signaling device) to cause the signaling device 308 to emit a sound (e.g., a doorbell tone, a user customized sound, a ringtone, a seasonal ringtone, etc.). The network interface 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. In one aspect of the present disclosure, the imager sensor 336 may comprise a complementary metal-oxide semiconductor (CMOS) array and may be capable of recording high definition (e.g., 722*p*, 1800*p*, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the network interface 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SD RAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 229 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the A/V recording and communication device (A/V device) 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the network interface 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the network interface 312 to the network 212 via the user's network 218, routed by the server(s) 224 and/or the API 226 and delivered to the client device(s) 214, 216 as described above in connection with FIG. 2. When the user speaks, after being transferred through the network 212, the user's network 218, and the network interface 312, the digital audio data from the user is decompressed by the audio CODEC 320 and emitted to the visitor through the speaker(s) 330.

With further reference to FIG. 3, the A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision module(s) (CVM) 316 may be included in the A/V device 210 as the motion sensor(s) 326, in addition to, or alternatively from, other motion sensor(s) 326. For example, the CVM 316 may be a low-power CVM (e.g., Qualcomm Glance) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. In various embodiments, the motion sensor(s) 326 include a plurality of different sensor types capable of detecting motion such as PIR, AIR, low-power CVM, and/or cameras.

As indicated above, the A/V device 210 may include the CVM 316 (which may be the same as the above described low-power CVM 316 implemented as one or more motion sensor(s) 326, or may be additional to, or alternative from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision module 316 may additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics.

Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics.

Again, with reference to FIG. 3, in embodiments where the A/V device 210 includes a light camera, the A/V device 210 may include the light controller 302 and one or more lights 304(a), 304(b) (collectively referred to herein as "lights 304"). The light controller 302 may include a switch for controlling the lights 304. For example, in response to the motions sensor(s) 326 and/or the camera 314 detecting motion, the light controller 236 may receive an output signal from the processor(s) 310 that causes the light controller 302 to activate the one or more lights 304(a), 304(b). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to being recording the image data, and the microphone(s) 328 to being recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in embodiments where the A/V device 210 includes a doorbell, such as the video doorbell 210(c), the A/V device 210 may include the button 306. In embodiments where the button 306 is a mechanical button (e.g., has a range of movement), the button 306 may make contact with a button actuator located within the video doorbell 210(c) when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(c), such as transmitting an output signal, using the network interface 312, to the signaling device 308 to cause the signaling device 308 to output a sound (e.g., via the wired 334(b) connection to the signaling device 308 and/or a wireless 334(a) connection to the signaling device 308). In addition, the processor(s) 310 may transmit an output signal (e.g., a user alert), using the network interface 312, to the client device(s) 214, 216 to indicate to the user(s) of the client device(s) 214, 216 that a person is present at the A/V device 210 (in some embodiments, via at least one of the hub device 202, the VA device 208, and/or one or more component of the network of servers/backend devices 220).

Although the A/V device 210 (or A/V device 210) is referred to herein as an "audio/video" device, the A/V device 210 need not have both audio and video functionality. For example, in some embodiments, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

Figure 4:
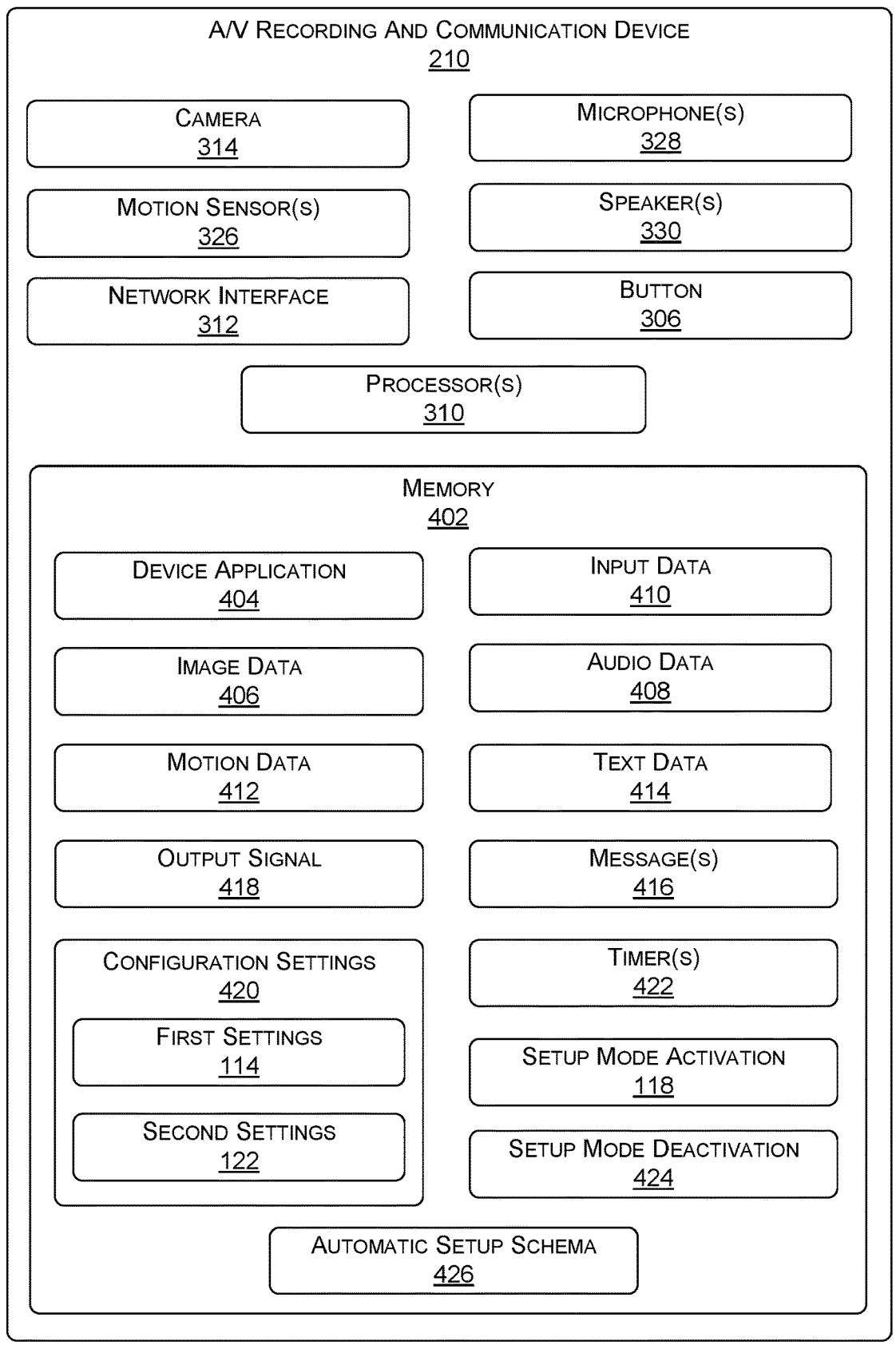

FIG. 4 is another functional block diagram illustrating an embodiment of the A/V device 210 according to various aspects of the present disclosure. In some embodiments, the A/V device 210 may represent, and further include one or more of the components from, the A/V doorbell 210(c), the A/V recording and communication security camera 210(a), and/or the floodlight controller 210(b). Additionally, in some embodiments, the A/V device 210 may omit one or more of the components shown in FIG. 4 and/or may include one or more additional components not shown in FIG. 4.

As shown in FIG. 4, the A/V device 210 includes memory 402, which may represent the volatile memory 322 and/or the non-volatile memory 324. The memory 402 stores a device application 404. In various embodiments, the device application 404 may include instructions that cause the processor(s) 310 to capture image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also include instructions that cause the processor(s) 310 to generate text data 414 describing the image data 406, the audio data 408, and/or the input data 410, such as in the form of metadata, for example.

In addition, the device application 404 may include instructions that cause the processor(s) 310 to transmit the image data 406, the audio data 408, the motion data 412, the input data 410, the text data 414, and/or message(s) 416 to the client devices 214, 216, the hub device 202, and/or the server(s) 224 using the network interface 312. In various embodiments, the device application 404 may include instructions that cause the processor(s) 310 to generate and transmit an output signal 418 that may include the image data 406, the audio data 408, the text data 414, the input data 410, and/or the motion data 412. In some of the present embodiments, the output signal 418 may be transmitted to the server(s) 224 and/or the hub device 202 using the network interface 312. The server(s) 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the server(s) 224, and the server(s) 224 may then transmit (or forward) the output signal 418 to the client device(s) 214, 216. In other embodiments, the output signal 418 may be transmitted directly to the client device(s) 214, 216 by the A/V device 210.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314. The image data 406 may be representative of a physical environment in a field of view of the camera 314. In some embodiments, the physical environment may include one or more objects (e.g., persons, vehicles, animals, items, etc.), and the image data 406 may be representative of the one or more objects, such as the one or more objects within the physical environment.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell (e.g., the video doorbell 210(c)), the A/V device 210 may not include the button 306, and the A/V device 210 may not generate the input data 410.

With further reference to FIG. 4, message(s) 416 may be generated by the processor(s) 310 and transmitted, using the network interface 312, to the client device 214, 216, the server(s) 224, and/or the hub device 202. For example, in response to detecting motion using the camera 314 and/or the motion sensor(s) 326, the A/V device 210 may generate and transmit the message(s) 416. In some of the present embodiments, the message(s) 416 may include at least the image data 406, the audio data 408, the text data 414, and/or the motion data 412.

As described herein, the message(s) 416 may include messages, signals, data, notifications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or one or more components of the network(s) of servers/backend devices 220). For instance, message(s) 416 may include push notifications, email messages, short message service (SMS) messages, multimedia messages (MMS), voicemail messages, video signals, audio signals, data transmissions, and/or any other type of electronic communication that an electronic device can send to another electronic device.

The image data 406, the audio data 408, the text data 414, and/or the motion data 412 may be tagged with (e.g., a time stamp, based on clock data) and/or stored separately (e.g., on the server(s) 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the server(s) 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and transmitting the image data 406, the audio data 408, the text data 414, and/or the motion data 412 when motion is detected (e.g., in the message(s) 416), in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

As described herein, at least some of the processes of the server(s) 224, the hub device 202, and/or the client device 214, 216 may be executed by the A/V device 210.

In further reference to FIG. 4, the device application 404 may include instructions that cause the processor(s) 310 to automatically enter setup mode after the A/V device 210 is disconnected from a network for an extended time. The device application 404 may include instructions that cause the processor(s) 310, using the network interface 312, to establish a connection to a wireless network, and store configuration settings for connecting to the network as configuration settings 420. The configuration settings 420 may include, but are not limited to, an identity of the network (e.g., a service set identifier (SSID), an Internet Protocol (IP) address, etc.), a password associated with the network, access point (AP) settings of a previously connected client device, and/or any other device settings that can be modified and saved by the A/V device 210. The configuration settings 420 may include the first settings 114 and the second settings 122 (described above with reference to FIG. 1). When the A/V device 210 performs setup mode activation 118 for the first time, such as when the user presses a setup button on the A/V device 210, it may receive from the client device 214, 216 the first settings 114. In response to receiving the first settings 114, the device application 404 may include instructions that cause the processor(s) 310, using the network interface 312, to establish a first network connection to a wireless network using the first settings 114. In the event of a network connection loss, the processor(s) 310 of the A/V device 210, using the network interface 312, may attempt to reestablish the network connection using the first settings 114. The device application 404 may include instructions that cause the processor(s) 310 to always update the first settings 114 to store the last known network credentials. In various examples, the configuration settings 420 may maintain a copy of all known network credentials.

In various examples, the device application 404 may include instructions that cause the processor(s) 310 to use an automatic setup schema 426 to determine whether the A/V device 210 should perform a reconnection attempt or enter setup mode, without the user manually pressing the setup button. The automatic setup schema 426, in some embodiments, defines a predetermined looping pattern of timed actions performed by the A/V device 210 to attempt to reconnect. The automatic setup schema 426 includes attempting to reconnect to the last known network using the first settings 114, performing setup mode activation 118, waiting for a threshold period of time to elapse, performing setup mode deactivation 424 after the threshold period of time, and cycling through this pattern of actions until either the network connection is reestablished or the A/V device 210 connects to a client device (e.g., to receive new network configuration settings). In some embodiments, the automatic setup schema 426 may include performing a predetermined threshold number of reconnection attempts before performing the setup mode activation 118, or attempting to reconnect a predetermined threshold number of times before performing the setup mode activation 118. In some examples, the automatic setup schema 426 may be updated by the server(s) 224 and/or the hub device 202. For instance, the A/V device 210 may ship with a first version of the automatic setup schema 426, but may later receive (e.g., from the server(s) 224) an updated version of the automatic setup schema 426 with a different looping pattern of timed actions. In various examples, the server(s) 224 may maintain a copy of the automatic setup schema 426 that was pushed to the A/V device 210 to help determine when the A/V device 210 may enter automatic setup mode after detecting the loss of network connection (e.g., an hour after detecting the loss of network connection, at the start of the next hour after a threshold time has elapsed, etc.).

Upon performing setup mode activation 118, the device application 404 may include instructions that cause the processor(s) 310, using the network interface 312, to broadcast an access point (AP) (Bluetooth, Wi-Fi Direct, etc.) or to search for connection to an AP broadcast by the client device 214, 216 (e.g., based on previously stored settings of the device for connecting to the client device AP). When entering setup mode, the device application 404 may activate a timer(s) 422. While in setup mode, the device application 404 may include instructions that cause the processor(s) 310, using the timer(s) 422, to exit setup mode if a threshold amount of time has elapsed since entering setup mode.

In some examples, the processor(s) 310 of the A/V device 210, using the network interface 312, may determine that there is a network connection loss. In response to detection of the network connection loss, the device application 404 may include instructions that cause the processor(s) 310 to activate one or more timer(s) 422. The device application 404 may include instructions that cause the processor(s) 310 to use the timer(s) 422 to determine when to first attempt to reestablish the network connection and, in some embodiments, when to make any additional follow-up attempts. That is, rather than continuously attempting to reconnect to the network, the A/V device 210 may observe a delay between reconnection attempts. After the reconnection attempts exceed a threshold number of attempts, or the timer 422 exceeds a predetermined threshold time, as defined by the automatic setup schema 426, the A/V device 210 may perform setup mode activation 118, as described above. In some embodiments, the processor(s) 310 of the A/V device 210 may activate the timer(s) 422 when the A/V device 210 enters the device setup mode to limit the amount of time the A/V device 210 is broadcasting an AP or searching for a connection to an AP broadcast.

In various examples, the processor(s) 310 of the A/V device 210 may end setup mode by performing setup mode deactivation 424 if a connection to the client device 214, 216 has not been established within a threshold setup mode time. By performing setup mode deactivation 424, the processor(s) 310 of the A/V device 210, using the network interface 312, may stop broadcasting the AP, and/or may stop searching for a connection to an AP broadcast by the client device 214, 216. The processor(s) 310 of the A/V device 210, using the network interface 312, may then resume attempting to reestablish the network connection using the first settings 114. For example, if the A/V device 210 loses the network connection, it may attempt to reconnect to the network a predetermined number of times, then enter setup mode and begin broadcasting an AP. If the A/V device 210 has been broadcasting an AP for some threshold length of time, (e.g., 5 minutes, 15 minutes, etc.) and a client device 214, 216 has not connected to the AP and updated the connection settings for the A/V device 210, the processor(s) 310 of the A/V device 210 may exit the setup mode and resume attempting to reestablish the network connection. As described above, the processor(s) 310 of the A/V device 210 may repeat the loop of entering setup mode, waiting for the client device 214, 216 to connect to the AP broadcast by the A/V device 210 (and/or searching for the AP broadcast by the client device 214, 216) and exiting the setup mode to attempt to reestablish the network connection.

After establishing a connection to the client device 214, 216, the A/V device 210 may receive the second settings 122 from the client device 214, 216. The second settings 122 may include changes to the network credentials for the same network device 104, or may be new network credentials for a new network device 104. The device application 404 may include further instructions that cause the processor(s) 310, using the network interface 312, to establish a network connection to the network device 104 using the second settings 122. In various examples, the processor(s) 310 of the A/V device 210 may perform setup mode deactivation 424 before attempting to establish the network connection to the network device 104. By performing setup mode deactivation 424, the A/V device 210 may stop broadcasting the AP and/or may stop searching for a connection to an AP broadcast by the client device 214, 216.

Figure 5:
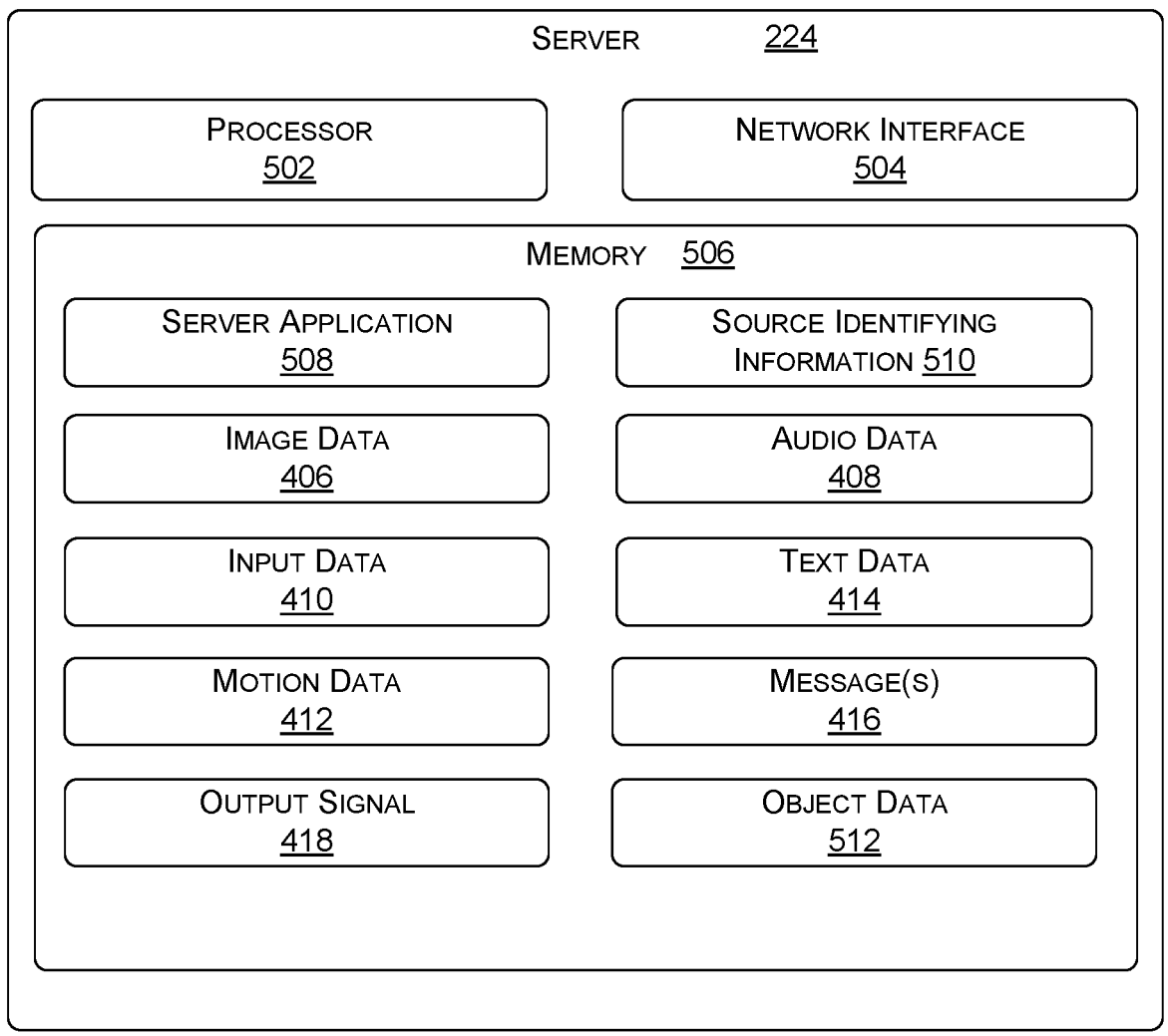
FIG. 5 is a functional block diagram illustrating one example embodiment of a server according to various aspects of the present disclosure.

FIG. 5 is a functional block diagram illustrating one embodiment of the server(s) 224 according to various aspects of the present disclosure. The server(s) 224 may comprise one or more processor(s) 502 (which may be similar to, and/or include similar functionality as, the processor(s) 310), a network interface 504 (which may be similar to, and/or include similar functionality as, the network interface 312), and a memory 506 (which may be similar to, and/or include similar functionality as, the memory 402). The network interface 504 may allow the server(s) 224 to access and communicate with devices connected to the network (Internet/PSTN) 212 (e.g., the A/V device 210, the hub device 202, the client devices 214, 216, and/or a device controlled by the security monitoring service 228).

The memory 506 may include a server application 508 that includes instructions that cause the processor(s) 502 to receive and/or retrieve the audio data 408, the text data 414, the input data 410, the message(s) 416, the image data 406, and/or the motion data 412 from the A/V device 210 (e.g., in the output signal 418) and/or the hub device 202. The server application 508 may include instructions that cause the processor(s) 502 to transmit (and/or forward) the audio data 408, the text data 414, the input data 410, the message(s) 416, the image data 406, and/or the motion data 412 to the client devices 214, 216 using the network interface 504.

Although referred to as the server(s) 224 with reference to the processes described herein, the server(s) 224 may additionally, or alternatively, include one or more of the devices from the network(s) of servers/backend devices 220. For example, the processes described herein with respect to the server(s) 224 may additionally, or alternatively, at least in part, be performed by one or more backend APIs 226.

In further reference to FIG. 5, the memory 506 may also include source identifying information 510 that may be used to identify the A/V device 210, the hub device 202, and/or the client devices 214, 216. In addition, the source identifying information 510 may be used by the processor(s) 502 of the server(s) 224 to determine the client devices 214, 216 are associated with the A/V device 210 and/or the hub device 202.

In some embodiments, the server application 508 may include instructions that cause the processor(s) 502 to generate and transmit a report signal (not shown) to a third-party client device (e.g., electronic device(s) 234), which may be associated with a law enforcement agency or the security monitoring service 228, for example. The report signal, which may be the message(s) 416, in some examples, may include the image data 406, the audio data 408, the text data 414, and/or the object data 512.

As described herein, at least some of the processes of the A/V device 210, the hub device 202, and/or the client device 214, 216 may be executed by the server(s) 224. For example, the processor(s) 502 of the server(s) 224, using the network interface 504, may detect a loss of connection to an A/V device 210 and perform processes according to automatic setup mode after extended disconnect time for the A/V device 210. After a threshold time, the server application 508 may include instructions that cause the processor(s) 502 to generate messages(s) 416 to prompt a client device 214, 216 associated with the A/V device 210 to perform device configuration to reconnect the A/V device 210.

In some examples, the processor(s) 502 of the server(s) 224, using the network interface 504, may establish a first connection with the A/V device 210. The processor(s) 502 of the server(s) 224, using the network interface 504, may detect a connection loss with the A/V device 210. In various examples, the processor(s) 502 of the server(s) 224, using the network interface 504, may attempt to reestablish a connection with the A/V device 210.

In response to being unable to reestablish the connection, the server application 508 may include instructions that cause the processor(s) 502 to use the source identifying information 510 to identify a client device 214, 216 associated with the A/V device 210, and to generate and send a message(s) 416 to the client device 214, 216. In some examples, the message(s) 416 may indicate that the A/V device 210 is disconnected from the network(s) 106. In various examples, the message(s) 416 may further include instructions to configure the A/V device 210 for reconnection to the network(s) 106.

Figure 6:
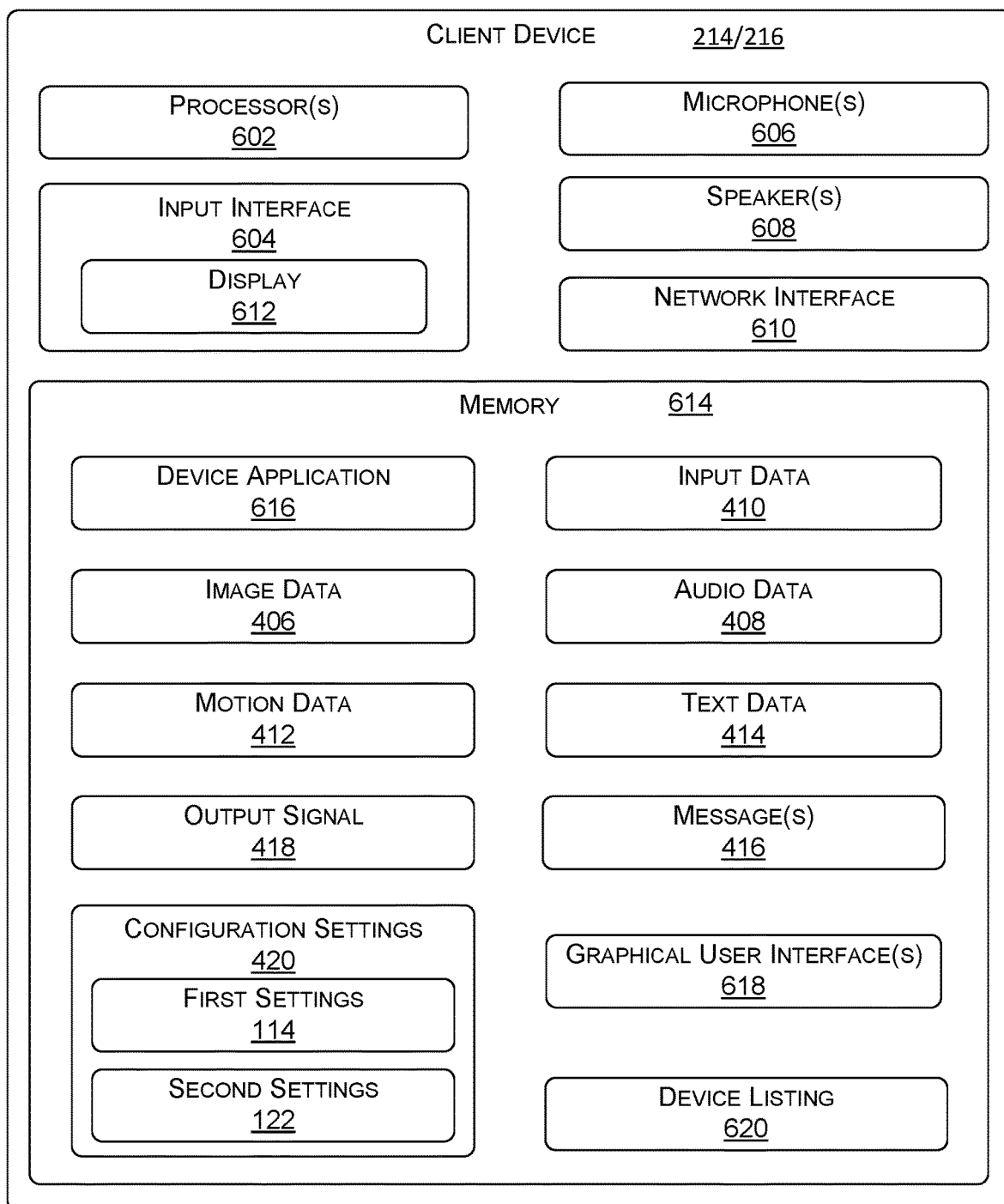
FIG. 6 is a functional block diagram illustrating one example embodiment of a client device according to various aspects of the present disclosure.

FIG. 6 is a functional block diagram illustrating one embodiment of the client device 214, 216, according to various aspects of the present disclosure. The client device 214, 216 may comprise one or more processor(s) 602 (which may be similar to, and/or include similar functionality as, the processor(s) 310) that are operatively connected to an input interface 604, microphone(s) 606, speaker(s) 608, a network interface 610 (which may be similar to, and/or include similar functionality as, the network interface 312), and memory 614 (which may be similar to, and/or include similar functionality as, the memory 402). The client device 214, 216 may further comprise a camera (not shown) operatively connected to the processor(s) 602. As described herein, at least some of the processes of the A/V device 210, the hub device 202, and/or the server(s) 224 may be executed by the client device 214, 216.

The memory 614 may store a device application 616. In addition, the device application 616 may include instructions that cause the processor(s) 602 to receive, using the network interface 610, the input data 410, the image data 406, the audio data 408, the output signal 418, and/or message(s) 416 from one or more of the A/V device 210, the hub device 202, or the server(s) 224.

With further reference to FIG. 6, the input interface 604 may include a display 612. The display 612 may include a touchscreen, such that the user of the client device 214, 216 may provide inputs directly to the display 612 (e.g., indications for desired updates to the configuration settings 420, indications for selecting the second settings 122, etc.). In some embodiments, the client device 214, 216 may not include a touchscreen. In such embodiments, and also in embodiments where the client device 214, 216 includes the touchscreen, the user may provide an input using any input device, such as, without limitation, a mouse, a trackball, a touchpad, a joystick, a pointing stick, a stylus, etc.

In some examples, in response to receiving a message(s) 416, the device application 616 may include instructions that cause the processor(s) 602 to cause the display 612 to display the message(s) 416. The message(s) 416 may indicate that the A/V device 210 detected motion, detected the presence of an object, received an input (e.g., to the button 306), etc. While displaying the message(s) 416, the input interface 604 may receive input from the user to answer the message(s) 416. In response, the device application 616 may include instructions that cause the processor(s) 602 to display the received image data 406 on the display 612 (e.g., display image(s) and/or video footage represented by the image data 406).

As further illustrated in FIG. 6, the processor(s) 602 of the client device 214, 216, using the network interface 610, may receive the messages 416 from a network device following a loss of network connection for the A/V device 210. The messages 416 may inform a user of the client device 214, 216 that the A/V device 210 is disconnected from the network(s) 106, and may prompt the user to perform a reconnection process, as described above.

In response to receiving a message(s) 416 from the network device, the device application 616 may include instructions that cause the processor(s) 602 to cause the display 612 to display a device listing 620. For example, the processor(s) 602 of the client device 214, 216 may cause a graphical user interface (GUI) 618 to be displayed on the display 612. The GUI 618 may include at least a portion of the device listing 620, such as the portion indicating a list of the A/V devices 210 that are currently associated with the client device 214, 216 and the network status of the A/V devices 210. The device listing 620 may further include the message(s) 416, or information similar to that contained in the message(s) 416.

In some examples, the message(s) 416, from the network device, may indicate that an A/V device 210 has been disconnected for a threshold time and may further include instructions to move the client device 214, 216 closer to, or within broadcasting proximity of, the A/V device 210. If the message(s) 416 include instructions to configure the A/V device 210, the device application 616 may include instructions that cause the processor(s) 602 to activate a device configuration mode. While in the device configuration mode, the client device 214, 216 may broadcast an access point (AP) (e.g., Bluetooth, Wi-Fi Direct, etc.) or may search for connection to an AP broadcast by the A/V device 210 (e.g., based on previously stored settings of the client device 214, 216 for connecting to the AP of A/V device 210). In response to the client device 214, 216 being within broadcast range of the A/V device 210, the client device 214, 216 may establish a connection with the AP broadcast by the A/V device 210.

In some examples, when the client device 214, 216 is in device configuration mode, the device application 616 may include instructions that cause the processor(s) 602, using the network interface 610, to determine that a connection to an A/V device 210 may not be found or established. The device application 616 may include further instructions that cause the processor(s) 602 to cause the display 612 to display the message(s) 416 including instructions to move the client device 214, 216 closer to, and/or within broadcast range of, the A/V device 210.

The processor(s) 602 of the client device 214, 216 may then receive, using the input interface 604, input selecting one or more interface elements including the second settings 122 for the A/V device 210. The second settings 122 may be received as one or more inputs. For instance, the processor(s) 602 of the client device 214, 216 may receive, using the input interface 604, a first input for updating a first identifier associated with the first network to a second identifier associated with the first network, or a third identifier associated with a second network (e.g., a network associated with a new network device 104). The processor(s) 602 of the client device 214, 216 may further receive, using the input interface 604, a second input for updating a first password associated the first network to a second password associated with the first network, or a third password associated the second network. The client device 214, 216 may then transmit, using the network interface 610, the second settings 122 to the A/V device 210. In some examples, the A/V device 210 may use the second settings 122 to connect to the network(s) 106 and communicate with the network device 104. In response to the A/V device 210 reestablishing the connection, the processor(s) 602 of the client device 214, 216, using the network interface 610, may receive a message(s) 416 indicating that the A/V device 210 is connected.

In various examples, the GUI 618 may update at least a portion of the device listing 620, such as the portion indicating a list of the A/V devices 210 that are currently associated with the client device 214, 216 and the network status of the A/V devices 210. The device listing 620 may include message(s) 416 to indicate if any devices are still disconnected. If all A/V devices 210 are properly connected, the processor(s) 602 of the client device 214, 216 may deactivate the device configuration mode. In some examples, if the client device 214, 216 is still in device configuration mode, the processor(s) 602 of the client device 214, 216 may receive, using the input interface 604, an input selection to deactivate the device configuration mode.

Figure 7:
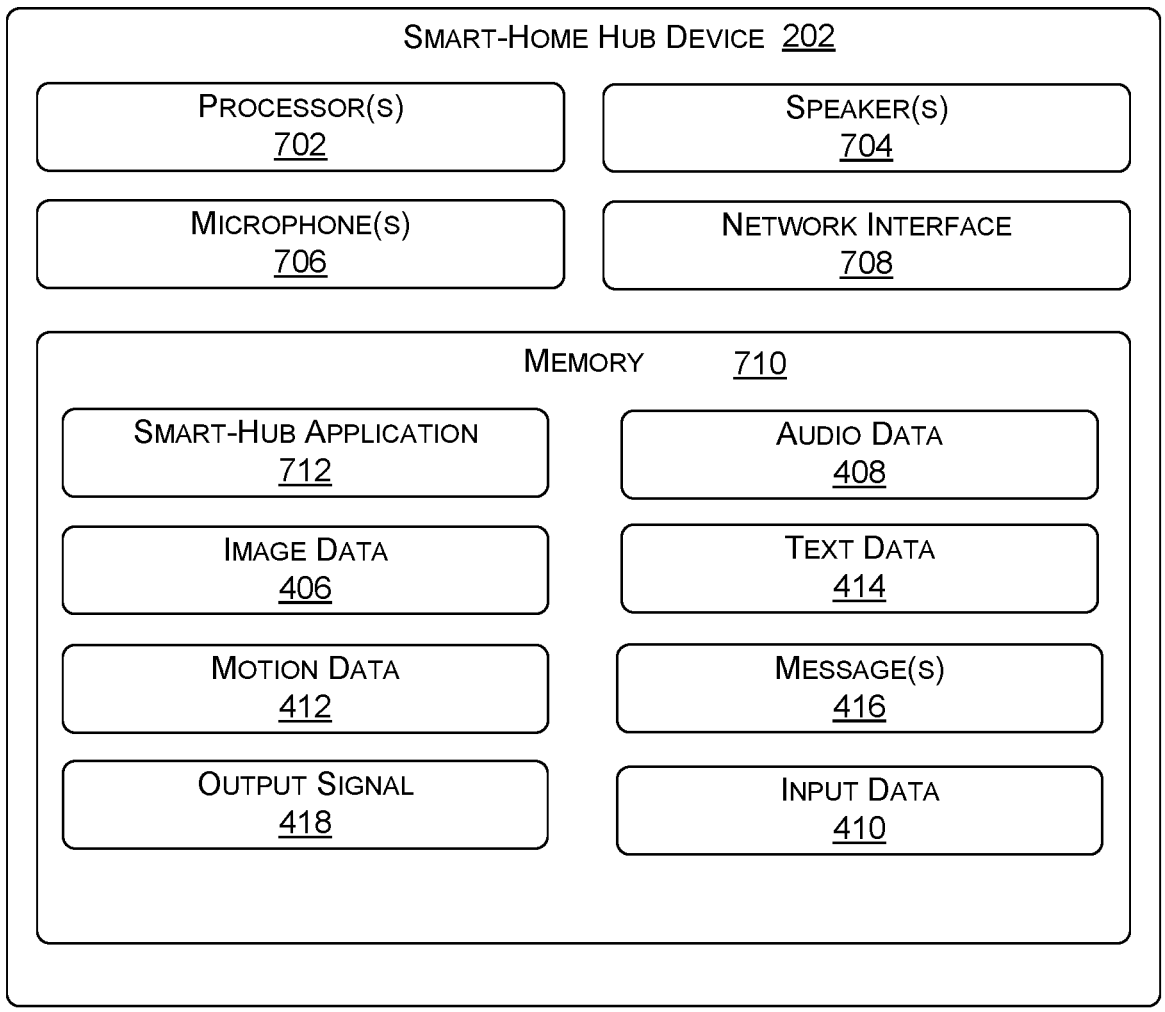
FIG. 7 is a functional block diagram illustrating one example embodiment of a smart-home hub device according to various aspects of the present disclosure.

FIG. 7 is a functional block diagram illustrating an embodiment of the smart-home hub device 202 (alternatively referred to herein as the "hub device 202") according to various aspects of the present disclosure. The hub device 202 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 212 for enabling remote control of the hub device 202), and/or another similar device. In some examples, the hub device 202 may include the functionality of the VA device 208. The hub device 202 may comprise processor(s) 702 (which may be similar to, and/or include similar functionality as, the processor(s) 502) that are operatively connected to speaker(s) 704, microphone(s) 706, a network interface 708 (which may be similar to, and/or include similar functionality as, the network interface 504), and memory 710 (which may be similar to, and/or include similar functionality as, the memory 506). In some embodiments, the hub device 202 may further comprise one or more of a camera (not shown). In some embodiments, the hub device 202 may not include one or more of the components shown in FIG. 7, such as the speaker(s) 704 and/or the microphone(s) 706.

As shown in the example of FIG. 7, the memory 710 stores a smart-hub application 712. In various embodiments, the smart-hub application 712 may include instructions that cause the processor(s) 702 to receive sensor data from the sensors 204 and/or the automation devices 206. For example, the sensor data may include a current state (e.g., opened/closed for door and window sensors, motion detected for motion sensors, living room lights on/off for a lighting automation system, etc.) of each of the sensors 204 and/or the automation devices 206. In some of the present embodiments, the sensor data may be received in response to sensor triggers. The sensor triggers may be a door opening/closing, a window opening/closing, lights being turned on/off, blinds being opened/closed, etc. As such, the sensor data may include the current state of the sensors 204 and/or the automation devices 206 as well as any updates to the current state based on sensor triggers.

With further reference to FIG. 7, the smart-hub application 712 may include instructions that cause the processor(s) 702 to receive the audio data 408, the text data 414, the image data 406, the motion data 412, the input data 410, and/or the message(s) 416 from the A/V device 210 (in some embodiments, via the server(s) 224) using the network interface 708. For example, the hub device 202 may receive and/or retrieve (e.g., after receiving a signal from the A/V device 210 that the A/V device 210 has been activated) the image data 406, the input data 410, and/or the motion data 412 from the A/V device 210 and/or the server(s) 224 in response to motion being detected by the A/V device 210. The smart-hub application 712 may include instructions that cause the processor(s) 702 to transmit, using the network interface 708, the audio data 408, the text data 414, the image data 406, the motion data 412, the input data 410, and/or the message(s) 416 to the client device 214, 216, the server(s) 224, and/or an additional electronic device (e.g., a second A/V device 210, the automation device(s) 206, the sensor(s) 204, etc.).

As described herein, at least some of the processes of the A/V device 210, the server(s) 224, and/or the client device 214, 216 may be executed by the hub device 202. In some examples, the smart-hub application 712 may include instructions that cause the processor(s) 702 to detect a loss of connection to an A/V device 210, and to perform processes according to the automatic setup mode after extended disconnect time for the A/V device 210 (described above at least with reference to FIG. 5).

Figure 8:
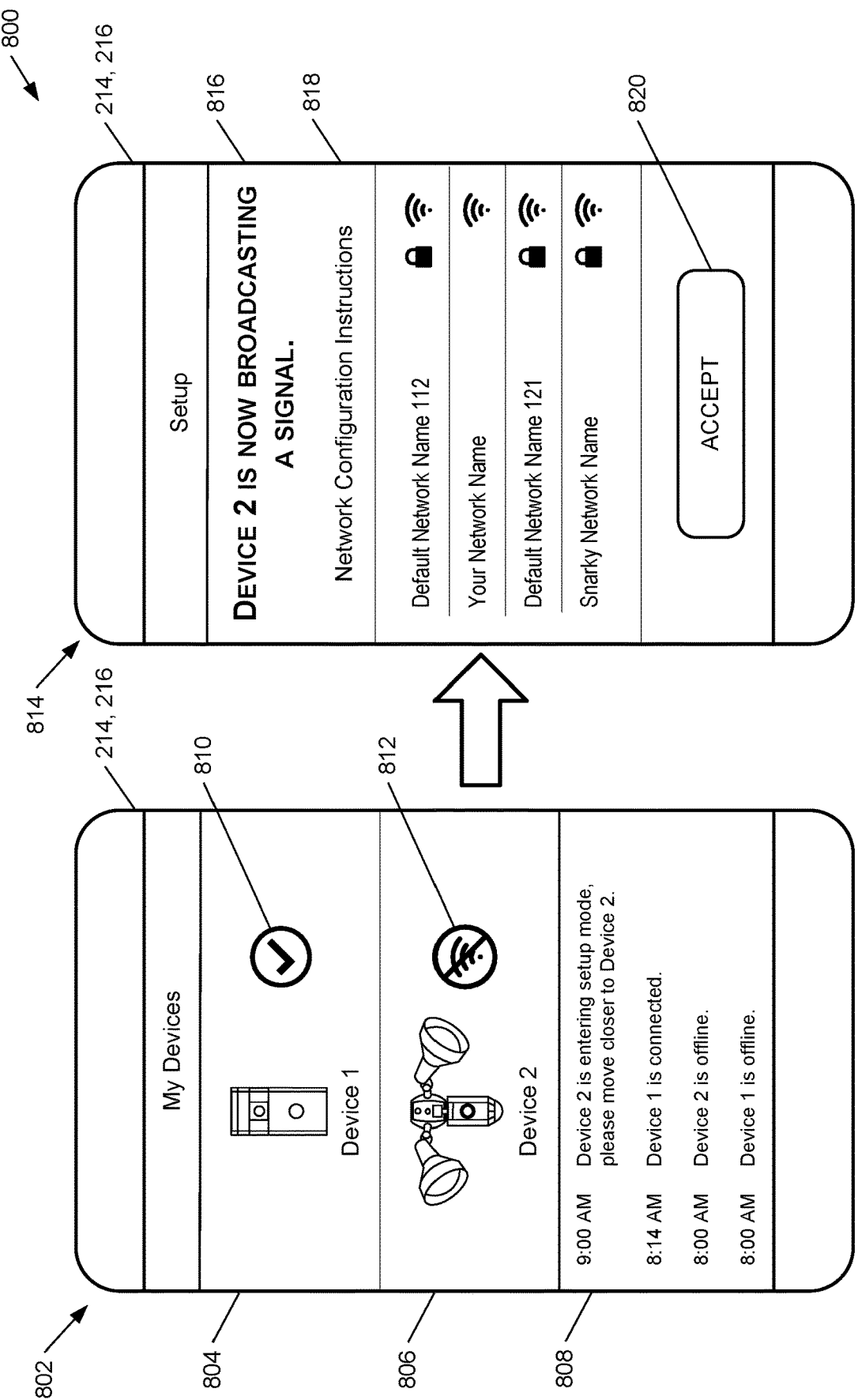
FIG. 8 is a schematic diagram illustrating example prompts sent to a client device according to various aspects of the present disclosure.

FIG. 8 illustrates example prompts 800 sent to a client device to perform device configuration in response to an A/V device automatically entering setup mode after an extended disconnect time, according to various aspects of the present disclosure. The example prompts 800 include a first GUI 802 with a prompt for the user to move closer to a disconnected A/V device 210, and a second GUI 814 with a prompt for the user to configure the A/V device 210. The processor 602 (FIG. 6) of the client device 214, 216 may execute instructions that cause the first GUI 802 and the second GUI 814 (either of which may represent the GUI 618) to be displayed using the display 612.

With further reference to FIG. 8, in the first GUI 802, the client device 214, 216 may, for example, display a first message(s) 808 (left-side of FIG. 8, which may represent the message(s) 416 of FIG. 4) regarding network connection status and/or events of the one or more A/V devices 210 registered to the user(s) associated with the client device 214, 216. The first GUI 802 may also display visual indicators 810, 812 of the connectivity states of the one or more A/V devices 210. For example, as shown, Device 1 includes a first connectivity indicator 810 that indicates the device is currently connected to the network, and Device 2 includes a second connectivity indicator 812 that indicates the device is currently disconnected from the network. As illustrated, the first GUI 802 may display a visual representation of the device type of the associated A/V device 210, which may include security cameras 210(a), light cameras 210(b) (e.g., floodlight cameras, spotlight cameras, etc.), video doorbells 210(c) (e.g., wall powered and/or battery powered video doorbells), and/or other devices capable of recording audio data and/or image data. In the present example, a first device indicator 804 illustrates the video doorbell 210(c), having the assigned name "Device 1," and the first connectivity indicator 810 indicating that Device 1 is connected to the network. A second device indicator 806 illustrates the floodlight camera 210(b), having the assigned name "Device 2," and the second connectivity indicator 812 indicating that Device 2 is not connected to the network. The message(s) 808 further indicate both Device 1 and Device 2 were disconnected from the network at 8:00 AM. Additionally, the message(s) 808 indicate that at 8:14 AM Device 1 was connected. Finally, the message(s) 808 indicate that Device 2 is entering setup mode at 9:00 AM, with instructions to prompt the user to move closer to Device 2.

When the client device 214, 216 is within AP broadcast range of the disconnected A/V device 210, the second GUI 814 may be displayed, including an indication 816 that the disconnected A/V device 210 is in communication range. Additionally, the second GUI 814 may also provide example instructions 818 to prompt the user to input information and/or commands to configure the A/V device 210. Following a user selection of an acceptance button 820, the client device may then transmit the network configuration to the A/V device 210 over the network broadcast by the A/V device 210 acting as an AP.

Each of the processes described herein, including the processes 900, 1000, 1100, and 1200, are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 9:
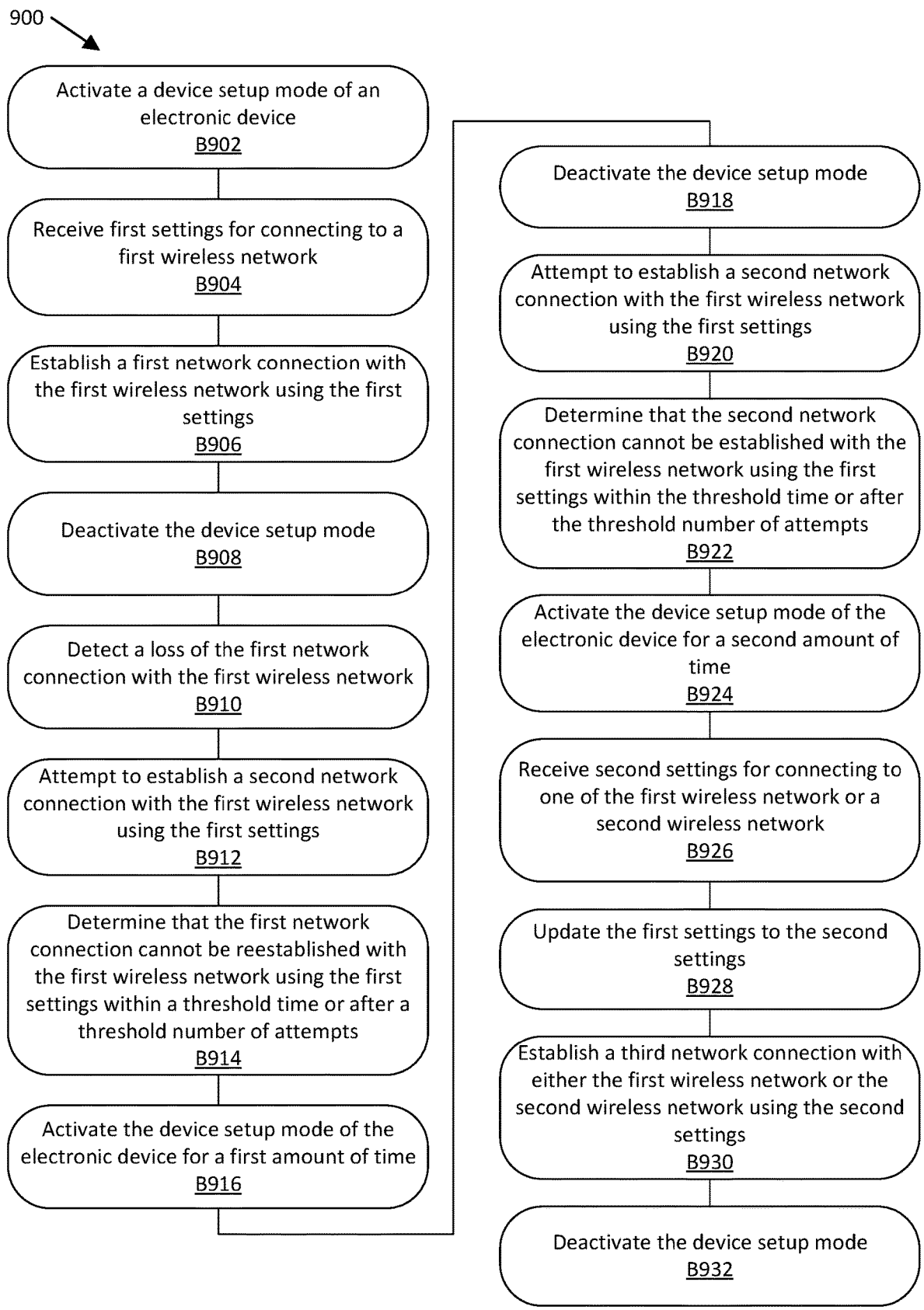
FIGS. 9-12 are flowcharts illustrating example processes for electronic devices automatically entering setup mode after extended disconnect time from a network, according to various aspects of the present disclosure.

FIG. 9 is a flowchart illustrating an example process 900 for electronic devices automatically entering setup mode after extended disconnect time from a network, according to various aspects of the present disclosure. The process 900, at block B902, includes activating a device setup mode of an electronic device. For example, the processor(s) 310 of the A/V device 210, using the network interface 312, may perform setup mode activation 118. By performing setup mode activation 118, the A/V device 210 may broadcast an access point (AP) (Bluetooth, Wi-Fi Direct, etc.) or may search for connection to an AP broadcast by the client device 214, 216.

The process 900, at block B904, includes receiving first settings for connecting to a wireless network. For example, the processor(s) 310 of the A/V device 210, using the network interface 312, may receive from a client device 214, 216 the first settings 114. When the A/V device 210 performs setup mode activation 118 for the first time, it may receive from the client device 214, 216 the first settings 114. The device application 404 may include instructions that cause the processor(s) 310 to always update the first settings 114 to store the last known network credentials. In various examples, the configuration settings 420 may maintain a copy of all known network credentials.

The process 900, at block B906, includes establishing a first network connection with the first wireless network using the first settings. For example, in response to receiving the first settings 114, the device application 404 may include instructions that cause the processor(s) 310 of the A/V device 210, using the network interface 312, to establish a first network connection with the wireless network 106 using the first settings 114.

The process 900, at block B908, includes deactivating the device setup mode. For example, the processor(s) 310 of the A/V device 210, using the network interface 312, may perform setup mode deactivation 424. By performing setup mode deactivation 424, the A/V device 210 may stop broadcasting the AP (Bluetooth, Wi-Fi Direct, etc.) and/or may stop searching for connection to an AP broadcast by the client device 214, 216.

The process 900, at block B910, includes detecting a loss of the first network connection with the first wireless network. For example, the processor(s) 310 of the A/V device 210, using the network interface 312, may determine that there is a loss of the connection to the wireless network 106.

The process 900, at block B912, includes attempting to establish a second network connection with the first wireless network using the first settings. For example, the processor(s) 310 of the A/V device 210, using the network interface 312, may attempt to reestablish the connection to the network 106 using the first settings 114. For example, when the A/V device 210 loses the network connection, it may attempt to reconnect to the network some number of times, or for some duration.

The process 900, at block B914, includes determining that the first network connection cannot be reestablished with the first wireless network using the first settings within a threshold time or after a threshold number of reconnection attempts. For example, in response to the network connection loss, the processor(s) 310 of the A/V device 210 may activate the timer(s) 422 and attempt to reestablish the network connection. The processor(s) 310 of the A/V device 210 may use the timer(s) 422 to determine when to make an attempt to reestablish the network connection and when to make any additional follow-up attempts. For example, rather than continuously attempting to reconnect to the network, the A/V device 210 may observe a delay between reconnection attempts. To reestablish network connection based on changes in network device configuration settings rather than general internet interruption, the A/V device 210 may attempt to search for an AP signal with known SSID based on the first settings. If the AP signal with known SSID is not found after the timer(s) 422 indicates that the threshold time has elapsed, the processor(s) 310 of the A/V device 210 may trigger automatic setup mode. If the AP signal with known SSID is found, the processor(s) 310 of the A/V device 210 may use the password based on the first settings to attempt to reestablish the network connection. If the A/V device 210 receives a notification (e.g., from the network device that it is trying to connect to) that the password based on the first settings does not match the current network password, then after a threshold number of reconnection attempts, or after the timer(s) 422 indicates that the threshold time has elapsed, the processor(s) 310 of the A/V device 210 may trigger automatic setup mode.

The process 900, at block B916, includes activating the device setup mode of the electronic device for a first amount of time. For example, based at least in part on the first network connection not being reestablished within the threshold time or after the threshold number of attempts, the processor(s) 310 of the A/V device 210, using the network interface 312, may perform setup mode activation 118 for a first amount of time, and without user intervention (e.g., without the user manually pressing a setup button on the A/V device 210). By performing setup mode activation 118, the A/V device 210 may broadcast an access point (AP) (Bluetooth, Wi-Fi Direct, etc.) and/or may search for connection to an AP broadcast by the client device 214, 216 (e.g., based on previously stored settings of the device for connecting to the client device AP). Additionally, the processor(s) 310 of the A/V device 210 may activate the timer(s) 422 when the A/V device 210 enters the device setup mode to limit the amount of time the A/V device 210 is broadcasting an AP and/or searching for a connection to an AP broadcast.

The process 900, at block B918, includes deactivating the device setup mode. For example, the processor(s) 310 of the A/V device 210 may end setup mode by performing setup mode deactivation 424 if a connection to the client device 214, 216 has not been established within a threshold setup mode time. By performing setup mode deactivation 424, the A/V device 210 may stop broadcasting the AP and/or may stop searching for a connection to an AP broadcast by the client device 214, 216. Based on exceeding a threshold time, the processor(s) 310 of the A/V device 210 may resume attempting to reestablish the network connection using the first settings 114.

The process 900, at block B920, includes attempting to establish a second network connection with the first wireless network using the first settings. For example, based on exceeding the threshold setup mode time, the processor(s) 310 of the A/V device 210, using the network interface 312, may resume attempting to reestablish the connection to the network 106 using the first settings 114. For example, if the A/V device 210 loses the network connection, it may attempt to reconnect to the network some number of times or for a threshold length of time.

The process 900, at block B922, includes determining that the second network connection cannot be established with the first wireless network using the first settings within the threshold time or after the threshold number of attempts. For example, in response to the network connection loss, the processor(s) 310 of the A/V device 210 may activate the timer(s) 422 and attempt to reestablish the network connection. To reestablish the network connection, the A/V device 210 may search for an AP signal with known SSID based on the first settings. If the AP signal with known SSID is not found after the timer(s) 422 indicates that the threshold time has elapsed, the processor(s) 310 of the A/V device 210 may trigger automatic setup mode. If the AP signal with known SSID is found, the processor(s) 310 of the A/V device 210 may use the password based on the first settings to attempt to reestablish the network connection. If the A/V device 210 receives a notification (e.g., from the network device that it is trying to connect to) that the password based on the first settings does not match the current network password, then after a threshold number of reconnection attempts, or after the timer(s) 422 indicates that the threshold time has elapsed, the processor(s) 310 of the A/V device 210 may trigger automatic setup mode.

The process 900, at block B924, includes activating the device setup mode of the electronic device for a second amount of time. For example, based at least in part on the second network connection not being reestablished within the threshold time or after the reconnection attempts exceed a threshold number of attempts, the processor(s) 310 of the A/V device 210, using the network interface 312, may perform setup mode activation 118 for a second amount of time. By performing setup mode activation 118, the A/V device 210 may broadcast an access point (AP) (Bluetooth, Wi-Fi Direct, etc.) and/or may search for connection to an AP broadcast by the client device 214, 216 (e.g., based on previously stored settings of the device for connecting to the client device AP). Additionally, the processor(s) 310 of the A/V device 210 may activate the timer(s) 422 when the A/V device 210 enters the device setup mode to limit the amount of time the A/V device 210 is broadcasting an AP and/or searching for a connection to an AP broadcast.

The process 900, at block B926, includes receiving second settings for connecting to one of the first wireless network or a second wireless network. For example, after establishing a connection to a client device 214, 216, from the A/V device 210 broadcasting an AP or from an AP broadcast by the client device 214, 216, the A/V device 210 may receive the second settings 122 from the client device 214, 216. The second settings 122 may include changes to the network credentials for the same network device 104, or may be new network credentials for a new network device.

The process 900, at block B928, includes updating the first settings to the second settings. For example, the device application 404 may include instructions that cause the processor(s) 310 to always update the first settings 114 to store the last known network credentials, which in this case is the second settings 122. In various examples, the configuration settings 420 may maintain a copy of all known network credentials.

The process 900, at block B930, includes establishing a third network connection with either the first wireless network or the second wireless network using the second settings. For example, the device application 404 may include instructions that cause the processor(s) 310, using the network interface 312, to establish the third network connection using the second settings 122.

The process 900, at block B932, includes deactivating the device setup mode. For example, the processor(s) 310 of the A/V device 210 may perform the setup mode deactivation 424, which may include the A/V device 210 ceasing broadcast of the AP or ceasing searching for a connection to an AP broadcast by the client device 214, 216. In various examples, the processor(s) 310 of the A/V device 210 may perform setup mode deactivation 424 before attempting to establish the third network connection.

Figure 10:
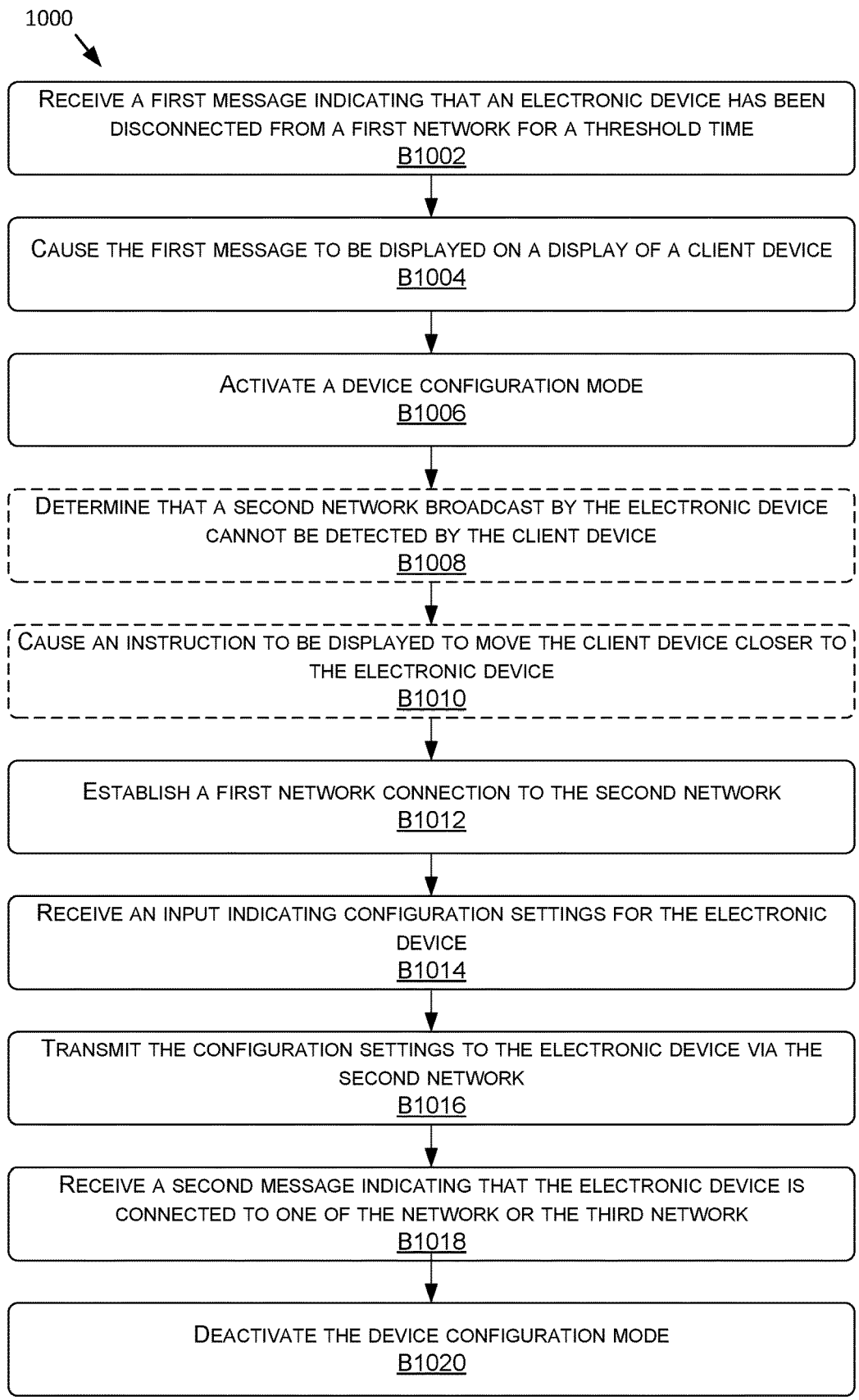

FIG. 10 is a flowchart illustrating another example process 1000 for electronic devices automatically entering setup mode after extended disconnect time from a network, according to various aspects of the present disclosure. The process 1000, at block B1002, includes receiving a first message indicating that an electronic device has been disconnected from a first network for a threshold length of time. For example, after the A/V device 210 has been disconnected from the wireless network 106 for the threshold length of time, the server application 508 may include instructions that cause the processor(s) 502 of the server(s) 224 to generate the message(s) 416 for a client device 214, 216 associated with the A/V device 210, and to send the message(s) 416 to the client device 214, 216. In some examples, the message(s) 416 may include data representing the network status of the A/V device 210 (e.g., a message indicating that the A/V device 210 is disconnected from the wireless network 106). In additional or alternative examples, the message(s) 416 may indicate that the A/V device 210 is in setup mode, or, if the A/V device 210 is not currently in setup mode, the message(s) 416 may indicate a time when the A/V device 210 will next be in setup mode. For example, the processor(s) 602 of the client device 214, 216, using the network interface 610, may receive the messages 416 from a network device following a loss of network connection for the A/V device 210. The messages 416 may inform a user of the client device 214, 216 that the A/V device 210 is disconnected from the network(s) 106, and may prompt the user to perform a reconnection process, as described above with respect to FIGS. 6 and 8.

At block 1004, after receiving the message(s) 416, the processor(s) of the client device(s) 214, 216 may cause the message(s) 416 to be displayed on the display 612 of the client device(s) 214, 216. For example, the processor(s) 602 of the client device 214, 216 may cause a graphical user interface (GUI) 618 to be displayed on the display 612. The GUI 618 may include at least a portion of the device listing 620, such as the portion indicating a list of the A/V devices 210 that are currently associated with the client device 214, 216 and the network status of the A/V devices 210. The device listing 620 may further include the message(s) 416, or information similar to that contained in the message(s) 416.

The process 1000, at block B1006, includes activating a device configuration mode. For example, if the message(s) 416 include data representative of instructions to configure the A/V device 210, the device application 616 may include instructions that cause the processor(s) 602 to activate the device configuration mode of the client device 214, 216. While in the device configuration mode, the client device 214, 216 may broadcast an access point (AP) (Bluetooth, Wi-Fi Direct, etc.) and/or may search for connection to an AP broadcast by the A/V device 210.

In some instances, the process 1000, at block B1008, may include determining that a second network broadcast by the electronic device cannot be detected by a client device. For example, the device application 616 may include instructions that cause the processor(s) 602, using the network interface 610, to determine that a network broadcast by the A/V device 210 cannot be detected. Block B1008 may occur, for example, when the client device 214, 216 is too far away from the A/V device 210 (e.g., the client device 214, 216 is out of wireless communication range of the A/V device 210). Because block B1008 may not occur in some instances of the process 1000, block B1008 is represented by dashed lines in FIG. 10.

When the client device 214, 216 is out of wireless communication range of the A/V device 210, the process 1000, at block B1010, includes causing an instruction to be displayed to move the client device closer to the electronic device. For example, when the client device 214, 216 is in device configuration mode, and the network broadcast by the A/V device 210 is not detected, the device application 616 may include instructions that cause the processor(s) 602 to cause the display 612 to display the message(s) 416 including instructions to move the client device 214, 216 closer to, or within broadcasting proximity of, the A/V device 210. Because block B1010 may not occur in some instances of the process 1000, block B1010 is represented by dashed lines in FIG. 10.

The process 1000, at block B1012, includes establishing a first network connection to the second network. For example, in response to the client device 214, 216 being within wireless communication range of the A/V device 210, the device application 616 may include instructions that cause the processor(s) 602, using the network interface 610, to establish a connection with the AP broadcast by the A/V device 210.

The process 1000, at block B1014, includes receiving an input indicating configuration settings for the electronic device. For example, the processor(s) 602 of the client device 214, 216 may receive, using the input interface 604, input indicating the second settings 122 for the A/V device 210. In some embodiments, the input may include the user providing new network credentials using the input interface 604 (e.g., typing the new network credentials). In various embodiments, the new network credentials may include a network name for a third network broadcast by a new network device 104, and/or a new password for either the first network or the third network. In other embodiments, the input includes the user selecting, using the input interface 604, a user interface element (e.g., a modal window) displayed on the display 612 of the client device(s) 214, 216. For example, the user interface element may comprise a representation of the configuration settings 420, including the second settings 122.

The process 1000, at block B1016, includes transmitting the configuration settings to the electronic device via the second network. For example, the processor(s) 602 of the client device 214, 216 may transmit, using the network interface 610, the second settings 122 to the A/V device 210.

The process 1000, at block B1018, includes receiving a second message indicating that the electronic device is connected to one of the first network or the third network. For example, in response to the A/V device 210 reestablishing the connection to the first network, or establishing a new connection to the third network, the processor(s) 602 of the client device 214, 216, using the network interface 610, may receive a message(s) 416, from a network device (e.g., the server 224), indicating that the A/V device 210 is connected.

The process 1000, at block B1020, includes deactivating the device configuration mode. For example, if all A/V devices 210 are properly connected, and after receiving the message(s) 416 indicating that the A/V device 210 is connected to one of the first network or the third network, the processor(s) 602 of the client device 214, 216 may deactivate the device configuration mode. In some examples, if the client device 214, 216 is still in device configuration mode, the processor(s) 602 of the client device 214, 216 may receive, using the input interface 604, input selecting an interface element to deactivate the device configuration mode, and the client device 214, 216 may then exit the device configuration mode.

Figure 11:
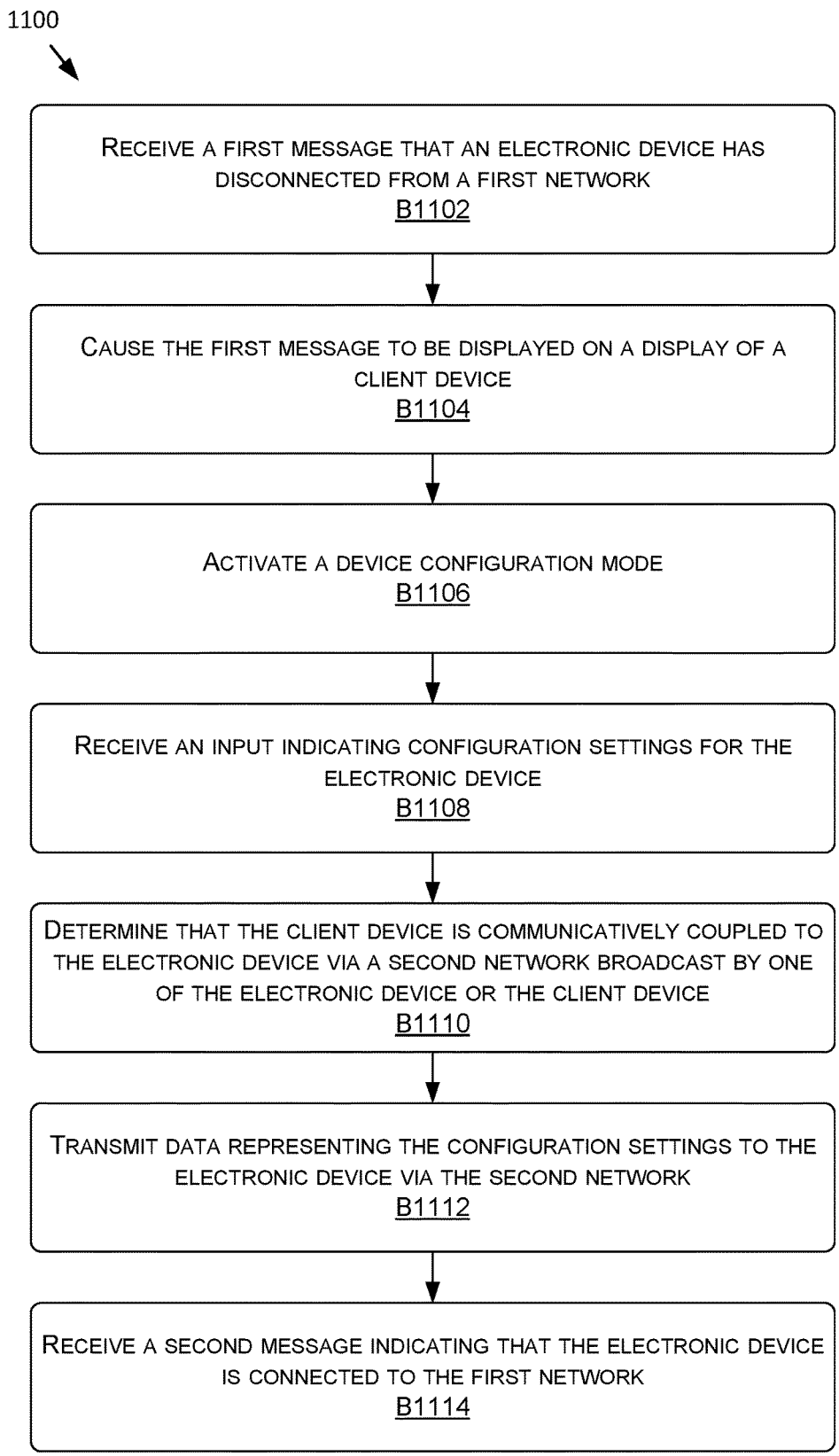

FIG. 11 is a flowchart illustrating another example process 1100 for electronic devices automatically entering setup mode after extended disconnect time from a network, according to various aspects of the present disclosure. The process 1100, at block B1102, includes receiving a first message that an electronic device has disconnected from a first network. For example, the processor(s) 602 of the client device 214, 216, using the network interface 610, may receive the messages 416 from a network device following a loss of network connection for the A/V device 210. The messages 416 may inform a user of the client device 214, 216 that the A/V device 210 is disconnected from the network(s) 106, and may prompt the user to perform a reconnection process, as described above with respect to FIGS. 6 and 8.

At block 1104, after receiving the message(s) 416, the processor(s) of the client device(s) 214, 216 may cause the message(s) 416 to be displayed on the display 612 of the client device(s) 214, 216. For example, the processor(s) 602 of the client device 214, 216 may cause a graphical user interface (GUI) 618 to be displayed on the display 612. The GUI 618 may include at least a portion of the device listing 620, such as the portion indicating a list of the A/V devices 210 that are currently associated with the client device 214, 216 and the network status of the A/V devices 210. The device listing 620 may further include the message(s) 416, or information similar to that contained in the message(s) 416.

The process 1100, at block B1106, includes activating a device configuration mode. For example, if the message(s) 416 include data representative of instructions to configure the A/V device 210, the device application 616 may include instructions that cause the processor(s) 602 to activate the device configuration mode. While in device configuration mode, the client device 214, 216 may broadcast an access point (AP) (Bluetooth, Wi-Fi Direct, etc.) or may search for connection to an AP broadcast by the A/V device 210.

The process 1100, at block B1108, includes receiving an input indicating configuration settings for the electronic device. For example, the processor(s) 602 of the client device 214, 216 may then receive, using the input interface 604, input selecting the second settings 122 for the A/V device 210. The input includes the user interacting with (e.g., selecting through a user interface a user interface element of a modal window displayed by a display device the client device(s) 214, 216) the configuration settings 420.

The process 1100, at block B1110, includes determining that a client device is communicatively coupled to the electronic device via a second network broadcast by one of the electronic device or the client device. For example, in response to the client device 214, 216 being within broadcasting range of the A/V device 210, the client device 214, 216 may, via an access point (AP) broadcast by the A/V device 210 or the client device 214, 216, establish a connection with the A/V device 210.

The process 1100, at block B1112, includes transmitting data representing the configuration settings to the electronic device via the second network. For example, the processor(s) 602 of the client device 214, 216 may then transmit, using the network interface 610, the second settings 122 for the A/V device 210.

The process 1100, at block B1114, includes receiving a second message indicating that the electronic device is connected to the first network. For example, in response to the A/V device 210 reestablishing connection, the processor(s) 602 of the client device 214, 216, using the network interface 610, may receive a message(s) 416 indicating that the A/V device 210 is connected.

Figure 12:
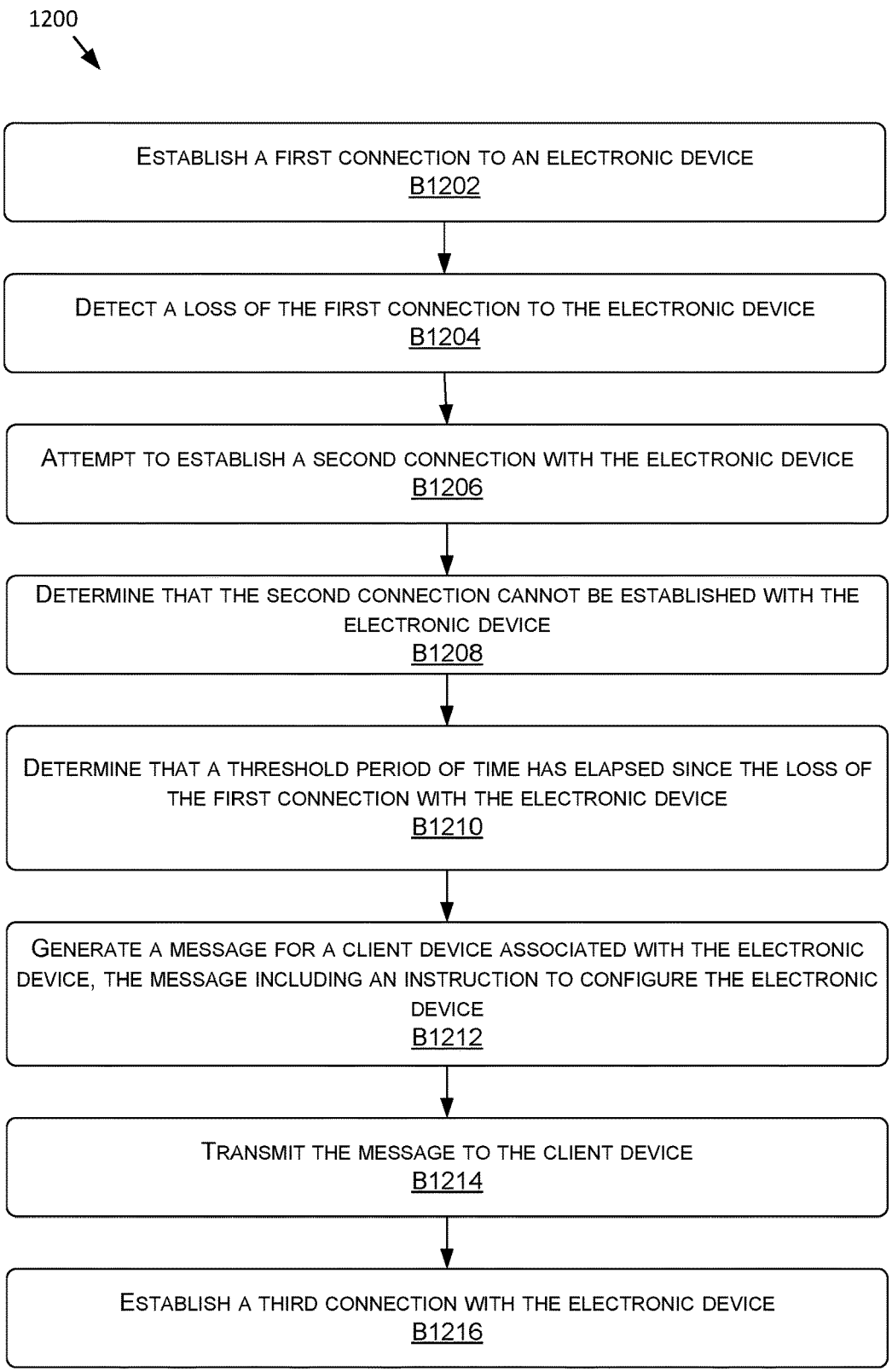

FIG. 12 is a flowchart illustrating another example process 1200 for electronic devices automatically entering setup mode after extended disconnect time from a network, according to various aspects of the present disclosure. The process 1200, at block B1202, includes establishing a first connection to an electronic device. For example, the processor(s) 502 of the server(s) 224, using the network interface 504, may establish a first connection with the A/V device 210.

The process 1200, at block B1204, includes detecting a loss of the first connection to the electronic device. For example, the processor(s) 502 of the server(s) 224, using the network interface 504, may detect a connection loss with the A/V device 210.

The process 1200, at block B1206, includes attempting to establish a second connection with the electronic device. For example, the processor(s) 502 of the server(s) 224, using the network interface 504, may attempt to reestablish the connection with the A/V device 210.

The process 1200, at block B1208, includes determining that the second connection cannot be established with the electronic device. For example, the processor(s) 502 of the server(s) 224, using the network interface 504, may determine that the connection with the A/V device 210 cannot be reestablished.

The process 1200, at block B1210, includes determining that a threshold period of time has elapsed since the loss of the first connection with the electronic device. For example, the server application 508 may include instructions that cause the processor(s) 502 to determine that a threshold period of time has elapsed since detecting the loss of the first connection with the A/V device 210.

The process 1200, at block B1212, includes generating a message for a client device associated with the electronic device, the message including an instruction to configure the electronic device. For example, after being unable to reestablish the connection with the A/V device 210, the server application 508 may include instructions that cause the processor(s) 502 to use the source identifying information 510 to identify a client device 214, 216 associated with the A/V device 210. The server application 508 may include further instructions that cause the processor(s) 502 to generate a message(s) 416 for the client device 214, 216. In some examples, the message(s) 416 may include data representative of the network status of the A/V device 210 (e.g., "Your A/V device is currently offline."). In additional or alternative examples, the message(s) 416 may include data representative of an amount of time left to connect the client device 214, 216 the A/V device 210, if the A/V device 210 is currently in setup mode, or an amount of time until the next setup mode, if the A/V device 210 is not currently in setup mode. As described above with respect to FIG. 4, the server(s) 224 may maintain a copy of the automatic setup schema 426 that was pushed to the A/V device 210 to help determine when the A/V device 210 may enter automatic setup mode after detecting the loss of network connection (e.g., an hour after detecting the loss of network connection, the start of the next hour after a threshold length of time has elapsed, etc.). For instance, if the server pushed an automatic setup schema for the A/V device to automatically enter device setup mode on the hour after a threshold length of time has elapsed, and the connection loss was detected at 8:44 AM, and the threshold length of time is one hour, then the server may determine that the next automatic setup mode would be triggered at 10:00 AM. In various examples, the message(s) 416 may include data representative of instructions to configure the A/V device 210 and/or instructions to move the client device 214, 216 closer to the A/V device 210 for device configuration.

The process 1200, at block B1216, includes transmitting the message to the client device. For example, after failing to reestablish the network connection with the A/V device 210, and the threshold time has elapsed, the processor(s) 502 of the server(s) 224, using the network interface 504, may transmit the message(s) 416 to the client device 214, 216 associated with the A/V device 210.

The process 1200, at block B1218, includes establishing a third connection with the electronic device. For example, the processor(s) 502 of the server(s) 224, using the network interface 504, may establish a connection with the A/V device 210.

Although the examples described herein for the processes include configuring an A/V device 210, in other examples, similar processes may be used to configure other types of electronic devices. For example, similar processes may be performed in order to configure sensors 204, automation devices 206, VA devices 208, hub devices 202, and/or any other type of electronic device that uses configuration settings to connect to a network.

The processes described herein are directed to automatically performing setup mode activation 118 for A/V devices (e.g., A/V device(s) 210, etc.) after a disconnect timer 422 exceeds a predetermined threshold time. By automatically performing setup mode activation 118 for an A/V device, such as the A/V device 210, the present embodiments enable such devices to be reconfigured (e.g., by receiving second settings 122) without the user having to manually press a reset button on the A/V device. The present embodiments thus create a significant advantage for devices that are difficult to reach, or to detach from their installation point. The convenience of reconfiguring a device without having to physically touch the device is of particular advantage to those people who may not be able to climb a ladder, or who may not be adept at using tools to detach a device from its installation point. Additionally, a server (e.g., the server(s) 224) may detect that a device has been disconnected, and may generate a message (e.g., the message(s) 416) and transmit the message to a client device (e.g., the client device 214, 216) to notify a user that the A/V device is disconnected and/or may be in setup mode and may be reconfigured. As such, the user may be more likely to promptly reconfigure the A/V device when needed. By promptly reconfiguring the device, the A/V device is better able to provide safety and security to the property, thereby contributing to the safety of the property, the neighborhood, and the public as a whole.

Figure 13:
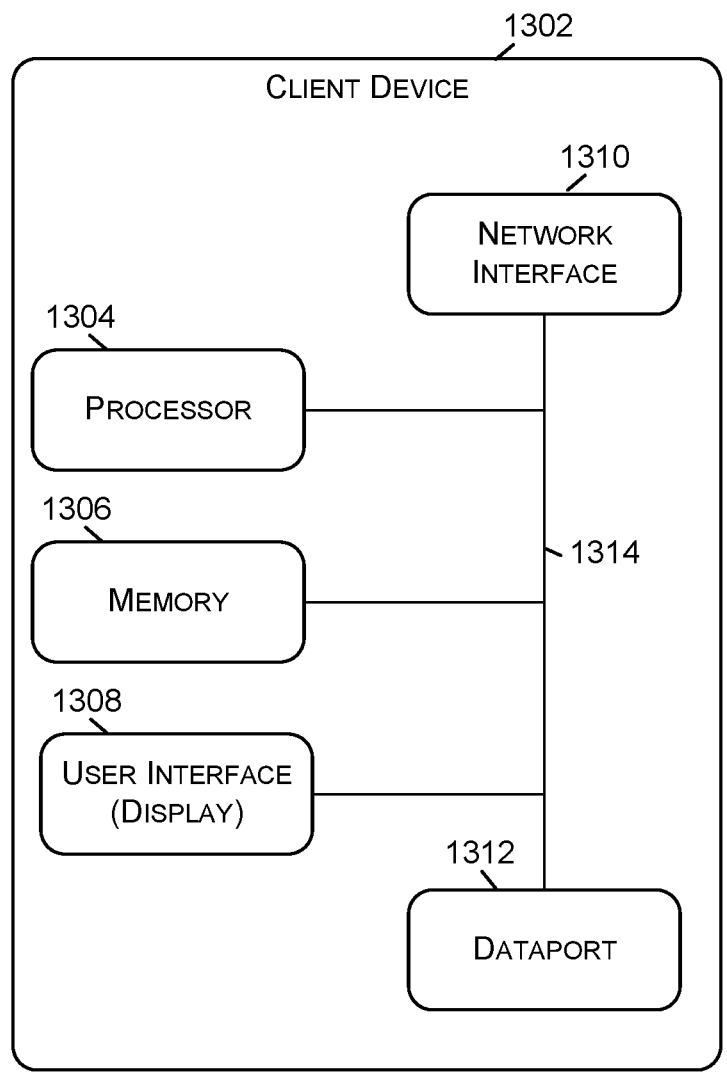
FIG. 13 is a functional block diagram of a client device on which the present embodiments may be implemented according to various aspects of the present disclosure.

FIG. 13 is a functional block diagram of a client device 1302 on which the present embodiments may be implemented according to various aspects of the present disclosure. The client device(s) 214, 216 described with reference to FIG. 2 may include some or all of the components and/or functionality of the client device 1302. The client device 1302 may comprise, for example, a smartphone.

With reference to FIG. 13, the client device 1302 includes a processor 1304, a memory 1306, a user interface 1308, a network interface 1310, and a dataport 1312. These components are communicatively coupled together by an interconnect bus 1314. The processor 1304 may include any processor used in smartphones and/or portable computing devices, such as an ARM processor (a processor based on the RISC (reduced instruction set computer) architecture developed by Advanced RISC Machines (ARM).). In some embodiments, the processor 2004 may include one or more other processors, such as one or more conventional microprocessors, and/or one or more supplementary co-processors, such as math co-processors.

The memory 1306 may include both operating memory, such as random-access memory (RAM), as well as data storage, such as read-only memory (ROM), hard drives, flash memory, or any other suitable memory/storage element. The memory 1306 may include removable memory elements, such as a CompactFlash card, a MultiMediaCard (MMC), and/or a Secure Digital (SD) card. In some embodiments, the memory 2006 may comprise a combination of magnetic, optical, and/or semiconductor memory, and may include, for example, RAM, ROM, flash drive, and/or a hard disk or drive. The processor 1304 and the memory 1306 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1304 may be connected to the memory 1306 via the dataport 1312.

The user interface 1308 may include any user interface or presentation elements suitable for a smartphone and/or a portable computing device, such as a keypad, a display screen, a touchscreen, a microphone, and a speaker. The network interface 1310 is configured to handle communication links between the client device 1302 and other, external devices or receivers, and to route incoming/outgoing data appropriately. For example, inbound data from the dataport 1312 may be routed through the network interface 1310 before being directed to the processor 1304, and outbound data from the processor 1304 may be routed through the network interface 1310 before being directed to the dataport 1312. The network interface 1310 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 1312 may be any type of connector used for physically interfacing with a smartphone and/or a portable computing device, such as a mini-USB port or an IPHONE®/IPOD® 30-pin connector or LIGHTNING® connector. In other embodiments, the dataport 1312 may include multiple communication channels for simultaneous communication with, for example, other processors, servers, and/or client terminals.

The memory 1306 may store instructions for communicating with other systems, such as a computer. The memory 1306 may store, for example, a program (e.g., computer program code) adapted to direct the processor 1304 in accordance with the present embodiments. The instructions also may include program elements, such as an operating system. While execution of sequences of instructions in the program causes the processor 1304 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 14:
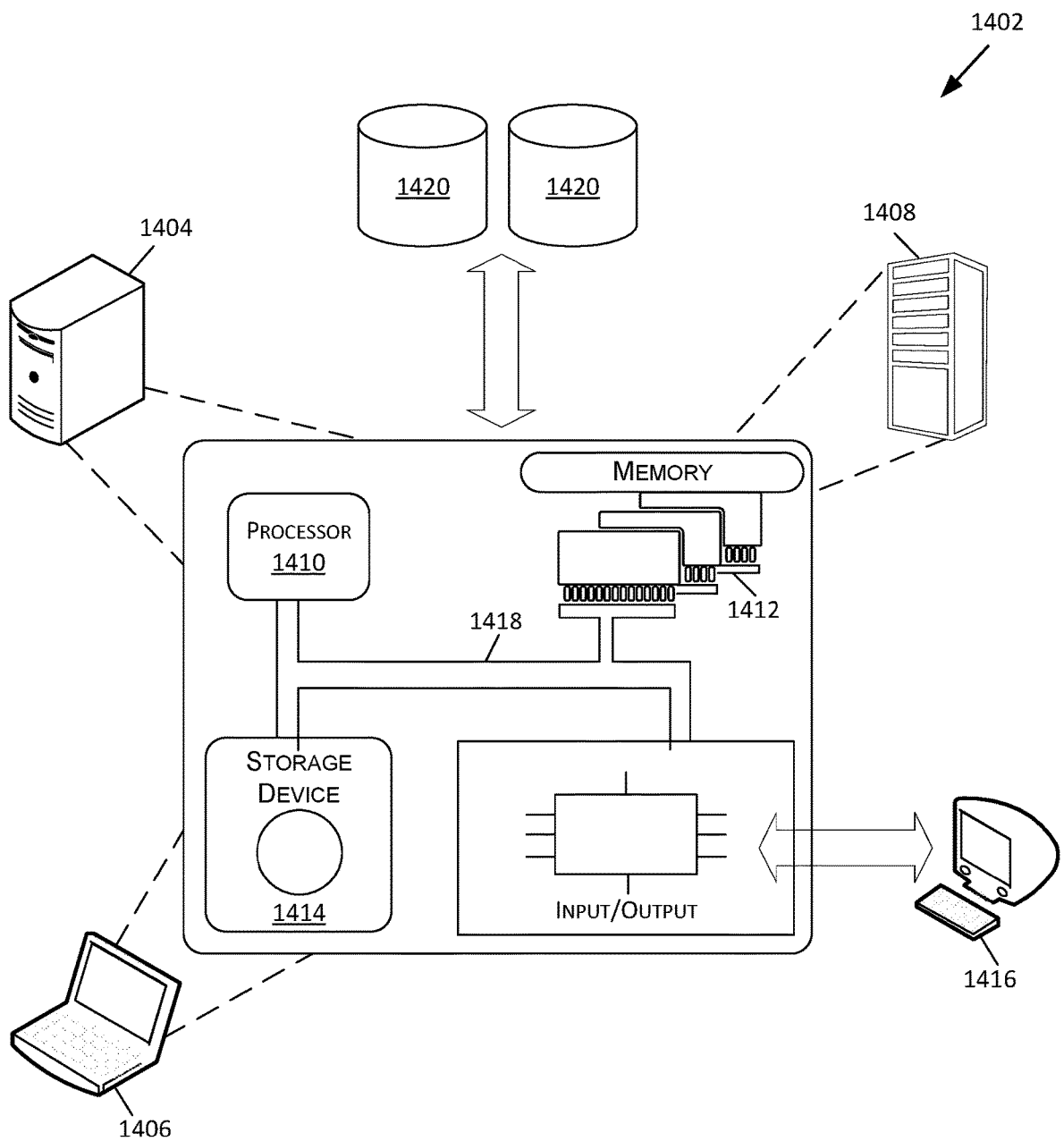
FIG. 14 is a functional block diagram of a general-purpose computing system on which the present embodiments may be implemented according to various aspects of present disclosure.

FIG. 14 is a functional block diagram of a general-purpose computing system on which the present embodiments may be implemented according to various aspects of the present disclosure. The computer system 1402 may be embodied in at least one of a personal computer (also referred to as a desktop computer) 1404, a portable computer (also referred to as a laptop or notebook computer) 1406, and/or a server 1408 is a computer program and/or a machine that waits for requests from other machines or software (clients) and responds to them. A server typically processes data. The purpose of a server is to share data and/or hardware and/or software resources among clients. This architecture is called the client—server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1402 may execute at least some of the operations described above. The computer system 1402 may include at least one processor 1410, memory 1412, at least one storage device 1414, and input/output (I/O) devices 1416. Some or all of the components 1410, 1412, 1414, 1416 may be interconnected via a system bus 1618. The processor 1410 may be single- or multi-threaded and may have one or more cores. The processor 1410 execute instructions, such as those stored in the memory 1412 and/or in the storage device 1414. Information may be received and output using one or more I/O devices 1416.

The memory 1412 may store information, and may be a computer-readable medium, such as volatile or non-volatile memory. The storage device(s) 1414 may provide storage for the system 1402 and, in some embodiments, may be a computer-readable medium. In various aspects, the storage device(s) 1414 may be a flash memory device, a hard disk device, an optical disk device, a tape device, or any other type of storage device.

The I/O devices 1416 may provide input/output operations for the system 1402. The I/O devices 1416 may include a keyboard, a pointing device, and/or a microphone. The I/O devices 1416 may further include a display unit for displaying graphical user interfaces, a speaker, and/or a printer. External data may be stored in one or more accessible external databases 1420.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

Example Clauses

In a first aspect, a method is provided for activating a device setup mode of an audio/video (A/V) recording and communication device (A/V device); receiving, from a client device and in the device setup mode, first settings for connecting to a first wireless network; establishing a first network connection with the first wireless network using the first settings; deactivating the device setup mode; detecting a loss of the first network connection with the first wireless network; activating a first timer; attempting to establish a second network connection with the first wireless network using the first settings; determining that the first timer has reached a first threshold time; after the first timer has reached the first threshold time and the second network connection has not been established, activating the device setup mode of the A/V device; activating a second timer; determining that the second timer has reached a second threshold time; after the second timer has reached a second threshold time, deactivating the device setup mode; again activating the first timer; again determining that the first timer has reached the first threshold time; again attempting to establish the second network connection with the first wireless network using the first settings; after the first timer has reached the first threshold time and the second network connection has not been established, again activating the device setup mode of the A/V device; receiving, from one of the client device or an additional client device, and in the device setup mode, second settings for connecting to one of the first wireless network or a second wireless network; deactivating the device setup mode; and establishing a third network connection with the one of the first wireless network or the second wireless network using the second settings.

In an embodiment of the first aspect, the method further comprising: activating the device setup mode occurs without user intervention.

In another embodiment of the first aspect, attempting to establish the second network connection comprises: searching for an access point using an identifier included in the first settings, the identifier being associated with the access point; and determining that the second network connection cannot be established for the first threshold time; and again attempting to establish the second network connection comprises: again searching for the access point using the identifier included in the first settings; and again determining that the second network connection cannot be established for the first threshold time.

In another embodiment of the first aspect, attempting to establish the second network connection comprises: identifying an access point using an identifier included in the first settings, the identifier being associated with the access point; and determining that the second network connection cannot be established using a password included in the first settings; and again attempting to establish the second network connection comprises: again identifying the access point using the identifier included in the first settings; and again determining that the second network connection cannot be established using the password included in the first settings.

In a second aspect, a method is provided for an audio/video (A/V) recording and communication device (A/V device), the A/V device comprising: one or more processors; a network interface; and one or more computer-readable media storing instructions that, when executed by the one or more processors, cause the one or more processors to perform operations comprising: establishing, using the network interface, a first network connection with a first wireless network using first settings; detecting a loss of the first network connection with the first wireless network; attempting to establish a second network connection with the first wireless network using the first settings; determining that a period of time has elapsed; after the period of time has elapsed and the second network connection has not been established, activating a device setup mode of the A/V device; receiving, from a client device and while in the device setup mode, second settings for connecting to the first wireless network or a second wireless network; deactivating the device setup mode; and establishing, using the second settings, a third network connection with the first wireless network or the second wireless network.

In an embodiment of the second aspect, activating the device setup mode occurs without user intervention.

In another embodiment of the second aspect, activating the device setup mode includes: generating a first direct network; and broadcasting the first direct network.

In another embodiment of the second aspect, attempting to establish the second network connection with the first wireless network comprises attempting to receive a signal from a network device associated with an identifier included in the first settings; and the one or more computer-readable media storing further instructions that, when executed by the one or more processors, cause the one or more processors to perform further operations comprising determining that a timer has reached the first threshold time.

In another embodiment of the second aspect, attempting to establish the second network connection with the first wireless network comprises: identifying a network device associated with an identifier included in the first settings; and determining that the second network connection cannot be established with the network device using a password included in the first settings.

In another embodiment of the second aspect, the one or more computer-readable media storing further instructions that, when executed by the one or more processors, cause the one or more processors to perform further operations comprising storing the first settings instead of the second settings.

In another embodiment of the second aspect, the one or more computer-readable media storing further instructions that, when executed by the one or more processors, cause the one or more processors to perform further operations comprising: determining that an additional period of time has elapsed; after the additional period of time has elapsed, deactivating the device setup mode; again attempting to establish the second network connection with the first wireless network using the first settings; and again determining that a period of time has elapsed, wherein attempting to establish the second network connection with the first wireless network occurs after again determining that the period of time has elapsed.

In another embodiment of the second aspect, the first settings include a first identifier and a first password associated with the first wireless network; and the second settings include at least one of: a second password associated with a first network device; or a second identifier and a third password associated with the second wireless network.

In a third aspect, a method is provided for detecting a loss of a first network connection with a first wireless network; attempting to establish a second network connection with the first wireless network using first configuration settings; determining that a condition associated with establishing the second network connection with the first wireless network is satisfied; after determining that the condition is satisfied, activating, without user intervention, a device setup mode; while in the device setup mode, establishing a third network connection with a client device; receiving, from the client device and using the third network connection, data representative of second configuration settings for connecting to the first wireless network or a second wireless network; and establishing, using the second configuration settings, a fourth network connection with the first wireless network or the second wireless network.

In an embodiment of the third aspect, the method further comprising, after receiving the second configuration settings, deactivating device setup mode.

In another embodiment of the third aspect, activating the device setup mode comprises: generating a third wireless network; and broadcasting the third wireless network, wherein establishing the third network connection with the client device comprises establishing, with the client device, the third network connection using the third wireless network.

In another embodiment of the third aspect, determining that the condition is satisfied comprises: activating a timer; and determining that the timer has reached a threshold time before establishing the second network connection with the first wireless network.

In another embodiment of the third aspect, determining that the condition is satisfied comprises: attempting to receive a signal from a network device, the network device being associated with an identifier included in the first configuration settings; and determining that the signal is not received from the network device for a period of time.

In another embodiment of the third aspect, determining that the condition is satisfied comprises: identifying a network device associated an identifier included in the first configuration settings; and determining, using a password included in the first configuration settings, that the second network connection cannot be established with the network device.

In another embodiment of the third aspect, determining that the condition is satisfied comprises determining that the second network connection cannot be established with a network device a threshold number of time.

In another embodiment of the third aspect, the method further comprising: storing data representing the first configuration settings, the first configuration settings including at least a first identifier and a first password associated with the first wireless network, wherein the second configuration settings including one of: a second password associated with the first wireless network; or a second identifier and a third password associated with the second wireless network.

What is claimed is:

1. A method comprising:
   receiving, by an audio/video (A/V) recording and communication device (A/V device), setup data representing at least a first time period for operating in a device setup mode and a second time period for operating in the device setup mode;
   activating the device setup mode of the A/V device;
   receiving, from a client device and in the device setup mode, first settings for connecting to a first wireless network;
   establishing a first network connection with the first wireless network using the first settings;
   deactivating the device setup mode;
   detecting a loss of the first network connection with the first wireless network;
   during the first time period represented by the setup data, activating the device setup mode of the A/V device;
   after the first time period, attempting to establish a second network connection with the first wireless network using the first settings;
   determining that the second network connection has not been established;
   after determining that the second network connection has not been established and during the second time period represented by the setup data, again activating the device setup mode of the A/V device;
   receiving, from one of the client device or an additional client device, and in the device setup mode, second settings for connecting to one of the first wireless network or a second wireless network;
   deactivating the device setup mode; and
   establishing a third network connection with the one of the first wireless network or the second wireless network using the second settings.

2. The method of claim 1, wherein activating the device setup mode occurs without user intervention.

3. The method of claim 1, wherein attempting to establish the second network connection comprises:
   searching for an access point using an identifier included in the first settings, the identifier being associated with the access point; and
   determining that the second network connection cannot be established.

4. The method of claim 1, wherein attempting to establish the second network connection comprises:

identifying an access point using an identifier included in the first settings, the identifier being associated with the access point; and determining that the second network connection cannot be established using a password included in the first settings.

5. An audio/video recording and communication device (A/V device), the A/V device comprising:

one or more processors;

a network interface; and one or more computer-readable media storing instructions that, when executed by the one or more processors, cause the one or more processors to perform operations comprising:

receiving, using the network interface, setup data representing at least a first time period for operating in a device setup mode of the A/V device and a second time period for operating in the device setup mode;

establishing, using the network interface, a first network connection with a first wireless network using first settings;

detecting a loss of the first network connection with the first wireless network;

during the first time period represented by the setup data, activating the device setup mode of the A/V device;

after the first time period, attempting to establish a second network connection with the first wireless network using the first settings;

after the second network connection has not been established and during the second time period represented by the setup data, again activating the device setup mode of the A/V device;

receiving, from a client device and while in the device setup mode, second settings for connecting to the first wireless network or a second wireless network;

deactivating the device setup mode; and establishing, using the second settings, a third network connection with the first wireless network or the second wireless network.

6. The A/V device of claim 5, wherein activating the device setup mode occurs without user intervention.

7. The A/V device of claim 5, wherein activating the device setup mode includes:

generating a first direct network; and broadcasting the first direct network.

8. The A/V device of claim 5, wherein attempting to establish the second network connection with the first wireless network comprises attempting to receive a signal from a network device associated with an identifier included in the first settings.

9. The A/V device of claim 5, wherein attempting to establish the second network connection with the first wireless network comprises:

identifying a network device associated with an identifier included in the first settings; and determining that the second network connection cannot be established with the network device using a password included in the first settings.

10. The A/V device of claim 5, the one or more computer-readable media storing further instructions that, when executed by the one or more processors, cause the one or more processors to perform further operations comprising storing the second settings instead of the first settings.

11. The A/V device of claim 5, wherein:

the first settings include a first identifier and a first password associated with the first wireless network; and the second settings include at least one of:

a second password associated with the first wireless network; or a second identifier and a third password associated with the second wireless network.

12. The A/V device of claim 5, wherein receiving the setup data comprises at least receiving, using the network interface and via the first network connection, the setup data from one or more computing devices.

13. A method comprising:

receiving setup data representing at least a first time period for operating in a device setup mode and a second time period for operating in the device setup mode;

detecting a loss of a first connection with a first wireless network;

during the first time period represented by the setup data, activating, without user intervention, the device setup mode;

after the first time period, attempting to establish a second connection with the first wireless network using first configuration settings;

during the second time period represented by the setup data, again activating, without user intervention, the device setup mode;

while in the device setup mode, establishing a third connection with a client device;

receiving, from the client device and using the third connection, data representative of second configuration settings for connecting to the first wireless network or a second wireless network; and establishing, using the second configuration settings, a fourth connection with the first wireless network or the second wireless network.

14. The method of claim 13, further comprising, after receiving the second configuration settings, deactivating the device setup mode.

15. The method of claim 13, wherein activating the device setup mode comprises:

generating a third wireless network; and broadcasting the third wireless network, wherein establishing the third connection with the client device comprises establishing, with the client device, the third connection using the third wireless network.

16. The method of claim 13, further comprising:

storing configuration data representing the first configuration settings, the first configuration settings including at least a first identifier and a first password associated with the first wireless network, wherein the second configuration settings including one of:

a second password associated with the first wireless network; or a second identifier and a third password associated with the second wireless network.

17. The method of claim 13, wherein receiving the setup data comprises at least receiving, via the first connection, the setup data from one or more computing devices.

* * * * *